United States Patent
Miyata et al.

(10) Patent No.: US 6,843,533 B1
(45) Date of Patent: Jan. 18, 2005

(54) RECLINING DEVICE

(75) Inventors: Kakuji Miyata, Yokohama (JP); Akira Sasaki, Yokohama (JP); Masaaki Nonomiya, Yokohama (JP); Toshikazu Minagawa, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 10/009,729

(22) PCT Filed: Jun. 16, 2000

(86) PCT No.: PCT/JP00/03959

§ 371 (c)(1),
(2), (4) Date: Jan. 31, 2002

(87) PCT Pub. No.: WO00/76374

PCT Pub. Date: Dec. 21, 2000

(30) Foreign Application Priority Data

| Jun. 16, 1999 | (JP) | 11-170049 |
| Aug. 25, 1999 | (JP) | 11-238159 |
| Sep. 21, 1999 | (JP) | 11-266909 |
| Sep. 21, 1999 | (JP) | 11-266910 |

(51) Int. Cl.⁷ .......................................... B60N 2/22
(52) U.S. Cl. ............................ 297/367; 297/378.12
(58) Field of Search ...................... 297/367, 301.1, 297/378.12, 363, 364, 365

(56) References Cited

U.S. PATENT DOCUMENTS

| 5,622,407 A | * | 4/1997 | Yamada et al. ............. 297/366 |
| 5,813,724 A | * | 9/1998 | Matsuura et al. ........... 297/367 |
| 5,816,656 A | * | 10/1998 | Hoshihara et al. .......... 297/367 |
| 5,873,630 A | * | 2/1999 | Yoshida et al. ............. 297/367 |
| 5,984,413 A | * | 11/1999 | Baloche et al. ............. 297/367 |
| 5,988,751 A | * | 11/1999 | Yoshida et al. ............. 297/367 |
| 6,007,153 A | * | 12/1999 | Benoit et al. ............ 297/378.12 |
| 6,023,994 A | * | 2/2000 | Yoshida ....................... 74/530 |
| 6,024,410 A | * | 2/2000 | Yoshida .................... 297/301.1 |
| 6,039,400 A | * | 3/2000 | Yoshida et al. ............. 297/367 |
| 6,085,386 A | * | 7/2000 | Blanchard et al. ............ 16/325 |
| 6,092,874 A | * | 7/2000 | Kojima et al. .............. 297/367 |
| 6,112,370 A | * | 9/2000 | Blanchard et al. ............ 16/325 |
| 6,164,723 A | * | 12/2000 | Ganot .................... 297/378.12 |
| 6,253,894 B1 | * | 7/2001 | Schumann et al. ........... 192/15 |
| 6,474,740 B1 | * | 11/2002 | Kondo et al. ............... 297/367 |
| 2002/0175548 A1 | * | 11/2002 | Asano et al. ............... 297/367 |

FOREIGN PATENT DOCUMENTS

| JP | 07-136032 | 5/1995 |
| JP | 07-231820 | 9/1995 |
| JP | A-7-231820 | 9/1995 |
| JP | 08-052040 | 2/1996 |
| JP | A-11-46914 | 2/1999 |
| JP | 11-046914 | 2/1999 |
| JP | 11-056510 | 3/1999 |

\* cited by examiner

*Primary Examiner*—Peter M. Cuomo
*Assistant Examiner*—Stephanie Harris
(74) *Attorney, Agent, or Firm*—Arent Fox PLLC

(57) ABSTRACT

A reclining apparatus (20) is provided with a fixed plate (21) having guide portions (41, 42), a shaft (30), a rotary plate (22) having an internal gear (66), slide gears (70, 71), a cam member (72) and the like. The cam member (72) has a pair of hook portions (100) engaging with a receiving portion (87) in the slide gears (70, 71). The hook portion (100) and the receiving portion (87) are formed in such a shape as to move the slide gears (70, 71) is a direction of canceling a rotational moment applied to the slide gears (70, 71) due to a backward load applied to the seat back when the cam member (72) rotates in a lock canceling direction. A supporting portion (120) preventing the slide gears (70, 71) from moving in a direction of the rotational moment is provided in an opposing portion between the cam member (72) and the slide gears (70, 71).

6 Claims, 19 Drawing Sheets

RECLINING DEVICE

TECHNICAL FIELD

The present invention relates to a reclining apparatus suitable for adjusting an angle of incline of a backrest, for example, in a seat for an automobile.

BACKGROUND ART

Various types exist in the reclining apparatus, for example, there has been suggested an internal gear type reclining apparatus as described in Japanese Patent Application Laid-Open No. 7-231820. The internal gear type reclining apparatus is, as one embodiment thereof is shown in FIG. 18, provided with a fixed plate 3 having a pair of guide convex portions 1 and 2 opposing to each other, a slide gear 4 received between the guide convex portions 1 and 2, a rotary plate 6 having an internal gear 5, a cam member 7 and the like. The cam member 7 can be rotated in a direction of an arrow A in FIG. 18 (a lock canceling direction) by an operating lever 8. The fixed plate 3 is fixed to a frame in a seat cushion side. The rotary plate 6 is fixed to a frame in a seat back side and can rotate around a shaft 9 integrally together with the seat back.

A gear teeth portion 10 freely engaged with and disengaged from the internal gear 5 is formed in a front end portion of the slide gear 4. When the slide gear 4 is pressed toward the internal gear 5 by a cam surface 11 of the cam member 7, the gear teeth portion 10 is engaged with the internal gear 5 so as to be in a lock condition, whereby the rotary plate 6. That is, the seat back is fixed at a desired angle.

An engaging portion 13 engaging with a receiving portion 12 of the slide gear 4 is formed in the cam member 7. When the operating lever 8 is rotated in a clockwise direction and the slide gear 4 is driven in a direction moving apart from the internal gear 5 by the engaging portion 13, an engagement between the slide gear 4 and the internal gear 5 is canceled and the lock thereof is canceled, so that the rotary plate 6. That is, the seat back can rotate around the shaft 9.

In the reclining apparatus (FIG. 18) mentioned above, at a time of adjusting an angle of incline of the seat back in a condition that a passenger sits on the seat, a load (a backward load) of an upper half of the sitting person is applied to the seat back. In this case, since the front end portion of the slide gear 4 is going to rotate in a direction shown by an arrow R1 integrally together with the rotary plate 6 in a condition that the slide gear 4 is engaged with the internal gear 5 as shown in FIG. 19, a clockwise moment M1 is applied to the slide gear 4. The slide gear 4 is tilted due to the moment M1, and the slide gear 4 becomes in a condition of being pressed to a contact point B near a corner in a base end side of one guide convex portion 1 and a contact point C near a corner in front end side of another guide convex portion 2.

In this condition, when the engaging portion 13 of the cam member 7 is rotated in a clockwise direction by rotating the operating lever 8 in a lock canceling direction as shown in FIG. 20, a force f1 in a direction moving the slide gear 4 apart from the internal gear 5 is applied to the receiving portion 12 of the slide gear 4. However, since the force f1 generates a moment further tilting the slide gear 4 in a clockwise direction, the contact pressure in the contact points B and C is further increased, so that a great lock canceling force is required for operating the operating lever 8. Accordingly, the sitting person operates the operating lever 8 so as not to apply so much load to the seat back, and it is difficult to operate.

In the case of assuming a rear-end collision, or the like, in the lock condition in FIG. 18, a great input is applied in a direction shown by an arrow R1 in FIG. 19, whereby the moment M1 applied to the slide gear 4 is further increased. Accordingly, the contact force in the contact points B and C is further increased. Accordingly, in an engaging portion 15 close to the front end of the guide convex portion 2, a gap G between the gear teeth portion 10 and the internal gear 5 tends to be increased as shown in FIG. 21. As a result, the engaging efficiency between the slide gear 4 and the internal gear 5 is reduced, and it is difficult to ensure the engaging strength and the engaging rigidity. Accordingly, it is necessary to employ countermeasures such as increasing the gear teeth thickness or increasing the number of gear teeth. However, there is a limit for increasing the thickness of the gear teeth and the number of the gear teeth, and it causes increase of the whole size of the reclining apparatus.

Furthermore, in a reclining apparatus described in Japanese Patent Application Laid-Open No. 8-52040, a flange of a bracket formed in a shape obtained by vertically notching a hat is fixed to a fixed plate, an inner peripheral side end portion of a spiral spring is engaged with a notched cylindrical portion of the bracket, and an outer peripheral side end portion thereof is engaged with a pin fixed to a rotary plate. In this case, the bracket is positioned by fitting two holes formed in the flange to a convex portion formed in the fixed plate, and is fixed to the fixed plate by welding the flange to the fixed plate. Furthermore, the pin is fixed to the rotary plate by being inserted into a through hole formed in the rotary plate and thereafter caulking an inserted end.

Furthermore, in the reclining apparatus, the following structure is employed so that the fixed plate and the rotary plate slide with each other in a circumferential direction. That is, a circular recess step portion is formed in a center portion of one plate and a convex step portion fitting into the recess step portion is formed in a center portion of another plate, whereby both elements can relatively rotate around an axis. Furthermore, a plurality of pins having flanges are caulked and fixed to one plate, and the flanges of the pins prevent the outer peripheral portion of the end surface of another plate from moving in an axial direction. Accordingly, both plates relatively rotate in a circumferential direction in a condition of being in contact with each other.

Furthermore, it is necessary to provide a limit in a tilt range of the seat back. For example, in Japanese Patent Application Laid-Open No. 11-56510, there is disclosed an arrangement structured such that by forming an elongated through hole formed in a circular arc shape in one plate and fixing a pin inserted into the elongated through hole to another plate, the pin is brought into contact with the end portion of the elongated through hole and a seat back does not tilt more than the contact portion.

In the arrangement disclosed in Japanese Patent Application Laid-Open No. 8-52040, since the bracket engaged with the inner peripheral side end portion of the spiral spring is substantially formed in a hat, a space occupied by the flange of the bracket is increased, and there is a problem that the size of the bracket is increased. Furthermore, since the bracket is fixed by welding the edge portion of the flange to the fixed plate, the distance between the welded portion of the bracket and the cylindrical portion to which the load due to the spiral spring is applied is increased. Accordingly, in order to prevent a deformation between the welded portion and the cylindrical portion, it is necessary to increase a thickness of the bracket, so that there is a problem that not only the weight of the reclining apparatus is increased but also the 1 material cost and the working cost are increased.

Furthermore, a restricting means for the rotary plate using the elongated through hole and the pin inserted thereto is employed in many reclining apparatuses in addition to the structure disclosed in Japanese Patent Application Laid-Open No. 11-56510. However, since a pin exclusive for restricting a rotation is required, there is a problem that a number of the parts is increased.

Furthermore, as described in Japanese Patent Application Laid-Open No. 8-52040, in the arrangement for preventing another plate from relatively moving in the axial direction by the pin having the flange, at least three pins are required in view of a structural stability. However, there is a requirement to make the number of the parts as small as possible.

Furthermore, as described in Japanese Patent Application Laid-Open No. 8-52040, in the arrangement in which the convex step portion is fitted into the recess step portion so as to slide the fixed plate and the rotary plate in the circumferential direction, a contact area of the both is great, and a frictional resistance is increased due to burrs formed at a time of press punching, so that there may be a problem in which the seat back does not smoothly tilt. On the contrary, when a gap is formed between the fixed plate and the rotary plate, dusts enter into the sliding portion and a resistance in rotation is increased.

In general, the reclining apparatus is exerted with a load which is input via the seat back from a back portion of the sitting person, and the back frame carries the load within the seat back. A mounting portion of the reclining apparatus is mounted to the back frame by means of welding or bolts, and is directly supported to an upper rail of the seat slide or indirectly supported via a cushion frame. The load of the sitting person applied to the back frame is naturally applied to the reclining apparatus. However, the load is mainly applied to an engaging portion between the rotary plate and the fixed plate, that is, the engaging portion between the gear teeth portion of the slide gear and the internal gear.

In this case, a relational formula of the load in the reclining apparatus as mentioned above is shown as follows.

As shown in FIG. 22A, on the assumption that the load applied to the seat back is defined as "F", the distance from the center of rotation of the seat back to the point of application is defined as "L", the radius of the pitch circle between the slide gears $1a$ and $1b$ and the gear teeth portion of the internal gear $2$ is defined as "r", the reaction force generated due to the engagement between the upper slide gear $1a$ and the internal gear $2$ is defined as "fa", and the reaction force generated due to the engagement between the lower slide gear $1b$ and the internal gear $2$ is defined as "fb", the following formula is obtained on the basis of balance of force.

$$F+fb=fa$$

The following formula is obtained on the basis of balance of moment.

$$F \times L = (fa+fb) \times r$$

The following formulas are obtained on the basis of two formulas mentioned above.

$$fa=(L+r)\times F/2r$$

$$fb=(L-r)\times F/2r \qquad (1)$$

Accordingly, the load applied to the engaging position between the slide gears $1a$ and $1b$ and the internal gear $2$ is different between upper and lower portions, and it is known that the load applied to the upper slide gear $1a$ is larger than the load applied to the lower slide gear $1b$. Accordingly, the strength of the upper slide gear $1a$ must be higher than the strength of the lower slide gear $1b$. This matter can be applied to the guide portion of the slide gears $1a$ and $1b$. However, in an actual condition, two kinds of slide gears having different strength designs are not manufactured in order to simplify manufacturing operations or assembling operations. Furthermore, when the parts of the slide gears are made common as mentioned above, the strength design is made so as to cope with the upper load condition having a great load. This results in unnecessary increase of the thickness or the size in the slide gear arranged in the lower side, and results in increase of the size or the weight in overall the apparatus.

Furthermore, generally, in a condition in which the slide gear and the internal gear are engaged with each other, a back-lash is inevitably formed by the clearance for the engagement between the both gears. The back-lash is instantaneously formed when the sitting person leans against the seat back, however, if there is a difference in the load applied to the slide gear as mentioned above, there is a case in which the back-lash is formed two times at every engaging positions. FIGS. 23A ad 24A are graphs showing a condition in which the back-lash is formed. FIG. 23A shows a condition in which a load is applied to the seat back, whereby at first a back-lash is formed at the upper engaging position to which a great load is applied (a portion shown by reference symbol g1), and next back-lash (a portion shown by reference symbol g2) according to a small load application is formed at the lower engaging position. FIG. 24A simply shows a displacement of the seat back with respect to the case in which a load is applied to the seat back, and a parallel portion shown by reference symbols g1 and g2 shows a formation of the back-lash. As mentioned above, when the back-lash is formed in two stages, the sitting person feels discomfort and unpleasant sensation although these senses may be instantaneous, so that this is a problem to be improved.

In the reclining apparatus mentioned above, there is provided with a holding member for guiding rotation of the rotary plate and preventing both of the plates from breaking away from each other. The holding member has a pin and a flange fixed to the front end portion of the pin. For example, in the reclining apparatus disclosed in Japanese Patent Application Laid-Open Nos. 7-136032 and 7-231820, the holding member is provided in both plates one by one, and is arranged so as to slidably hold an outer peripheral portion of an opposing plate between its own plate and the flange.

In the reclining apparatus mentioned above, when the sitting person leans against the seat back and the load is applied to the seat back, the load is transmitted to the engaging position between the slide gear and the internal gear via the rotary plate. Therefore, a force breaking away both of the plate from each other is generated between the fixed plate and the rotary plate around the engaging position. Actually, it is possible to prevent the plates from breaking away by the holding member. However, there is a problem in which since the holding member provided in the rotary plate side naturally moves together with the rotary plate, the relative position between the holding member and the engaging position changes according to the angle of tilt of the seat back, and the elements sometimes move greatly apart from each other. That is, the holding member in the rotary plate side largely moves away from the engaging position at which the force breaking both of the plates away from each other is generated. Accordingly, the holding force applied by the holding member is not effectively applied to the engaging position, so that the engaging force is reduced. Therefore, the sizes of the holding member, the slide gear and the like are increased so as to ensure the strength thereof, and overall the apparatus has disadvantages in which the size and the weight thereof increase.

A first object of the present invention is to provide a reclining apparatus which can increase an engaging strength between an internal gear and a slide gear in the case of assuming a rear-end collision or the like.

A second object of the present invention is to provide a reclining apparatus which requires a small operating force at a time of canceling a lock and has an improved operability.

A third object of the present invention is to reduce material cost and working cost as well as making a bracket engaged with an inner peripheral side end portion of a spiral spring compact and thin so as to achieve weight saving.

A fourth object of the present invention is to achieve restriction of rotation of a rotary plate and restriction of movement in an axial direction against a fixed plate by reduced number of parts.

A fifth object of the present invention is to ensure tight contact between the fixed plate and the rotary plate so as to reduce frictional resistance between the both while preventing dusts from entering.

A sixth object of the present invention is to achieve compact design and weight saving, and improvement of strength while it is a matter of course to commonly use parts in a slide gear. A seventh object of the present invention is to reduce a back-lash generated at an engaging position between a slide gear and an internal gear.

An eighth object of the present invention is to provide a reclining apparatus which can effectively restrict a force applied so that a rotary plate tends to break away from a fixed plate without relation to a position of the rotary plate, as a result, can increase an engaging force between the slide gear and the internal gear so as to achieve compact design and weight saving, and improvement of strength.

DISCLOSURE OF THE INVENTION

The reclining apparatus in accordance with the present invention is applied to a reclining apparatus comprising: a fixed plate in which a first guide portion having a pair of mutually opposing guide walls and a second guide portion having a pair of mutually opposing guide walls are formed; a shaft provided in the fixed plate so as to freely rotate around an axis in a horizontal direction; a rotary plate relatively rotating around the shaft with respect to the fixed plate and in which an internal gear is formed along a circular arc around the shaft; a first slide gear received between respective guide walls of the first guide portion and freely moving between a lock position engaged with the internal gear and a lock canceling position moving apart from the internal gear; a second slide gear received between respective guide walls of the second guide portion and freely moving between a lock position engaged with the internal gear and a lock canceling position moving apart from the internal gear; and a cam member provided between the first slide gear and the second slide gear and simultaneously driving the slide gears between the lock position and the lock canceling position.

Furthermore, the invention achieving the first object is arranged such that a supporting portion having an inclined surface preventing the slide gear from moving in a direction of a rotational moment applied to the slide gear due to a backward load applied to the seat back is provided in a portion in which the cam member and the slide gear oppose to each other. In accordance with the invention, when a great backward load is input to the seat back such as the case of assuming a rear-end collision or the like, it is possible to prevent the slide gear from moving in a direction of the rotational moment, by the supporting portion.

In accordance with the invention for achieving the second object, the cam member has a pair of hook portions engaging with receiving portions respectively formed in the first and second slide gears, the hook portion and the receiving portion have a cam surface pressing the slide gear to the internal gear in a condition that the cam member rotates in the direction of the lock position, and the hook portion and the receiving portion are formed in a shape displacing the slide gear in an opposite direction to the rotational moment applied to the slide gear due to the backward load applied to the seat back (a direction canceling the rotational moment) when the cam member rotates in the lock canceling direction. In accordance with the invention, when the cam member is rotated in the lock canceling direction, the gear teeth portion of the slide gear moves in the direction moving apart from the internal gear while the slide gear displaces in a direction that an incline of the slide gear with respect to the guide wall becomes small, so that a contact pressure of the slide gear with respect to the guide wall is reduced and the lock canceling force can be reduced.

In this invention, it is preferable that the hook portion and the receiving portion are respectively provided near a center line of the slide gear in an area inside both side surfaces of the slide gear. By making the structure in the manner mentioned above, it is possible to construct the slide gear compact.

The invention for achieving the third object is arranged such that the bracket is provided with a vertical plate portion protruding out from an end surface of the fixed plate in an axial direction so as to engage with an inner peripheral side end portion of the spiral spring, and a bottom plate portion extending toward the shaft from an edge portion in the fixed plate side of the vertical plate portion, the bracket is fixed to the fixed plate by the bottom plate portion, the vertical plate portion is formed in a substantially semicircular cylindrical shape around the shaft, a plurality of notches extending to the vertical plate portion and the bottom plate portion are formed in a crossing portion between the vertical plate portion and the bottom plate portion, and convex portions fitting to the notches are provided in the fixed plate.

In accordance with the reclining apparatus having the structure mentioned above, since the bottom plate portion of the bracket extends toward the shaft from the edge portion of the vertical plate portion, there is no flange protruding outward such as the bracket formed in a hat-shape, and the load applied by the spiral spring engaging with the vertical plate portion is supported by the convex portion located immediately below the vertical plate portion. Accordingly, it is possible to make the bracket small, it is possible to set the design strength of the vertical plate portion to be small, and it is possible to make the thickness of the bracket thin. Furthermore, since the load of the spiral spring is supported by the convex portion, in the case of fixing the bracket to the fixed plate, for example, by means of welding, it is sufficient to perform a welding such a degree that the bracket is not broken away from the fixed plate. Accordingly, it is possible to simplify the welding of the bracket to the fixed plate, and it is possible to simply control a quality thereof. In this case, at a time of welding the bracket to the fixed plate, it is simple to weld the convex portion of the fixed plate to the notch of the bracket.

The invention for achieving the fourth object is arranged such that a pin protruding to the fixed plate side along an axial direction is provided in an outer peripheral portion of the rotary plate, an outer peripheral side end portion of the spiral spring is engaged with the pin, and a flange preventing the fixed plate from breaking away from the rotary plate is provided at a middle position between the spiral spring and the fixed plate in the pin. In accordance with the structure mentioned above, the pin serves two functions comprising: (1) mounting the spiral spring, and (2) preventing the fixed plate and the rotary plate from breaking away from each other. Furthermore, since a stopper being brought into contact with the pin when the fixed plate and the rotary plate relatively rotate to a predetermined range is provided in the outer peripheral portion of the fixed plate, it is possible to give to the pin third function (3) restricting the rotational range of the rotary plate, so that it is possible to further reduce the number of the parts.

The stopper can be set as a limit at a time of backward tilting or forward tilting the seat back, and it is possible to provide the limits at a time of forward tilting and backward tilting by providing the stoppers at two positions. In this case, in addition to the stopper with which the pin is brought into contact, a plurality of flange portions protruding to an outer peripheral side are formed in the fixed plate, and bolt holes for mounting the reclining apparatus to the flame of the seat cushion are formed in the flange portions. Accordingly, even when the stopper brought into contact with the pin is further provided, it is possible to manufacture within a range of an original yield.

The invention for achieving the fifth object is arranged such that in one of the fixed plate and the rotary plate, a linear protrusion being in slidable contact with another is provided all around the periphery of the shaft. It is possible to reduce a frictional resistance while closely attaching the both elements by sliding the fixed plate and the rotary plate with each other by the narrow linear protrusion. The linear protrusion can be processed in accordance with a press molding at a time of sheet metal processing the fixed plate or the rotary plate. Since the internal gear of the rotary plate is processed in accordance with the press molding, it is desirable to form the linear protrusion in the fixed plate taking an influence given to the processing into consideration.

The invention for achieving the sixth and seventh objects is arranged such that an urging member interposed between the fixed plate and the rotary plate and rotating the rotary plate in a direction in which the seat back tilts forward is provided, and a center of an engaging position between the first and second slide gears and the internal gear is arranged on a line vertically crossing a line along a standard tilt angle of the seat back and passing through a center of rotation of the rotary plate.

FIG. 22B schematically shows an arrangement of the slide gear in the reclining apparatus in accordance with the present invention. As shown in the drawing, a pair of slide gears $1a$ and $1b$ are arranged longitudinally, and a center of the engaging position between the gear teeth portions of the slide gears $1a$ and $1b$ and the internal gear $2$, that is, a center of the load application vertically crosses a line L1 extending along a standard tilt angle $\theta$ of the seat back, and is positioned on a line $12$ passing through a center (an axis $3$) of rotation of the rotary plate.

In this case, a relational formula of the load in the reclining apparatus in accordance with the present invention is shown as follows.

As shown in FIG. 22B, on the assumption that a load applied to the seat back is set to F, a distance from a center of rotation of the seat back to a point of application is set to L, a radius of a pitch circle between the slide gears $1a$ and $1b$ and the gear teeth portion of the internal gear $2$ is set to r, a reaction force generated due to an engagement between the front slide gear $1a$ and the internal gear $2$ is set to fa, and a reaction force generated due to an engagement between the rear slide gear $1b$ and the internal gear $2$ is set to fb, the following formulas are obtained on the basis of a balance of moment.

$$F \times L = (fa' + fb') \times r$$

fa'=fb'

The following formula is obtained on the basis of two formulas mentioned above.

$$fa' = fb' = L \times F / 2r \qquad (2)$$

Accordingly, a load applied to the engaging position of the slide gear is the same between the front and rear portions. Therefore, it is possible to design a pair of slide gears and the parts relating to the respective guide portions and the like of the slide gears under the same load condition, and it is possible to commonly use the parts. Furthermore, comparing the formula (2) mentioned above with the formula (1), it is apparent that the load fa'(=fb') applied to the engaging position of the present invention is smaller than the load fa applied to the conventional upper engaging position. Accordingly, it is possible to make the structure compact and light, and it is possible to improve the strength. Furthermore, since the load applied to a pair of slide gears is uniform, the backlashes generated at the engaging positions of the slide gears are simultaneously generate, so that the generating number of the backlash is reduced to one time.

Furthermore, since the load applied to a pair of slide gears is uniform, the backlashes generated at the engaging positions of the slide gears are simultaneously generated, so that it is possible to restrict the generation of the backlash to one time. FIGS. 23B ad 24B are graphs showing a condition that the back-lash is generated in accordance with the present invention. FIG. 23B shows a displacement of an upper end portion of the seat back generated at a time of backward applying the load to the seat back and next forward applying the load, and the backlash is generated at a portion shown by reference symbol g1. FIG. 24B simply shows a displacement of the seat back with respect to the case that the load is applied to the seat back, and a parallel portion shown by reference symbol g1 shows a generation of the back-lash. The backlash is generated at only one time in the case that the load is applied to the seat back. As a result, it is possible to restrict a sense of discomfort and an unpleasant sensation applied to the sitting person due to the generation of the backlash as much as possible.

The invention for achieving the eighth object is arranged such that there is provided with a holding member provided in the fixed plate, rotatably supporting the rotary plate and preventing the rotary plate from breaking away from the fixed plate, and an urging member interposed between the fixed plate and the rotary plate and rotating the rotary plate in a direction in which the seat back tilts forward.

In the reclining apparatus mentioned above, the rotary plate can be rotated with respect to the fixed plate by rotating the shaft and moving the first and second slide gears apart from the internal gear. The seat back is fixed by tilting the seat back due to an elastic force of the spiral spring or against the elastic force in this condition and reverse rotating the shaft at a desired position so as to engage the respective slide gears with the internal gear.

Furthermore, the present invention is characterized in that in the structure mentioned above, the holding member provided in the fixed plate is provided close to each of the slide gears and at least one by one in each of the slide gears, and at least a part of the portion holding the rotary plate of the holding member is located within a range of a width extending in an engaging direction of the slide gear.

In accordance with the arranging aspect of the holding member as mentioned above, the holding member always holds the rotary plate in the fixed plate near the engaging position between the slide gear and the internal gear without relation to the position (angle of rotation) of the rotary plate rotating together with the tilt of the seat back. This is because the holding member is provided in the fixed plate, and the relative position with respect to the slide gear is always fixed without relation to the rotation of the rotary plate. Since the holding member is located near the engaging position, it is possible to effectively restrict a force breaking away both the plates and generated around the engaging position. As a result, it is possible to always sufficiently secure the engaging force between the slide gear and the internal gear, and further it is possible to make the apparatus compact and light and improve the strength. Particularly, in accordance with the present invention, since at least a part of the portion holding the rotary plate in the holding member is located within the range of the width extending in the engaging direction of the slide gear, the operation restricting the force for breaking away both the plates is more effectively applied.

BEST MODE FOR CARRYING OUT THE INVENTION FIRST EMBODIMENT

A description will be given below of a first embodiment in accordance with the present invention with reference to FIGS. 1 to 8.

Figure 1:
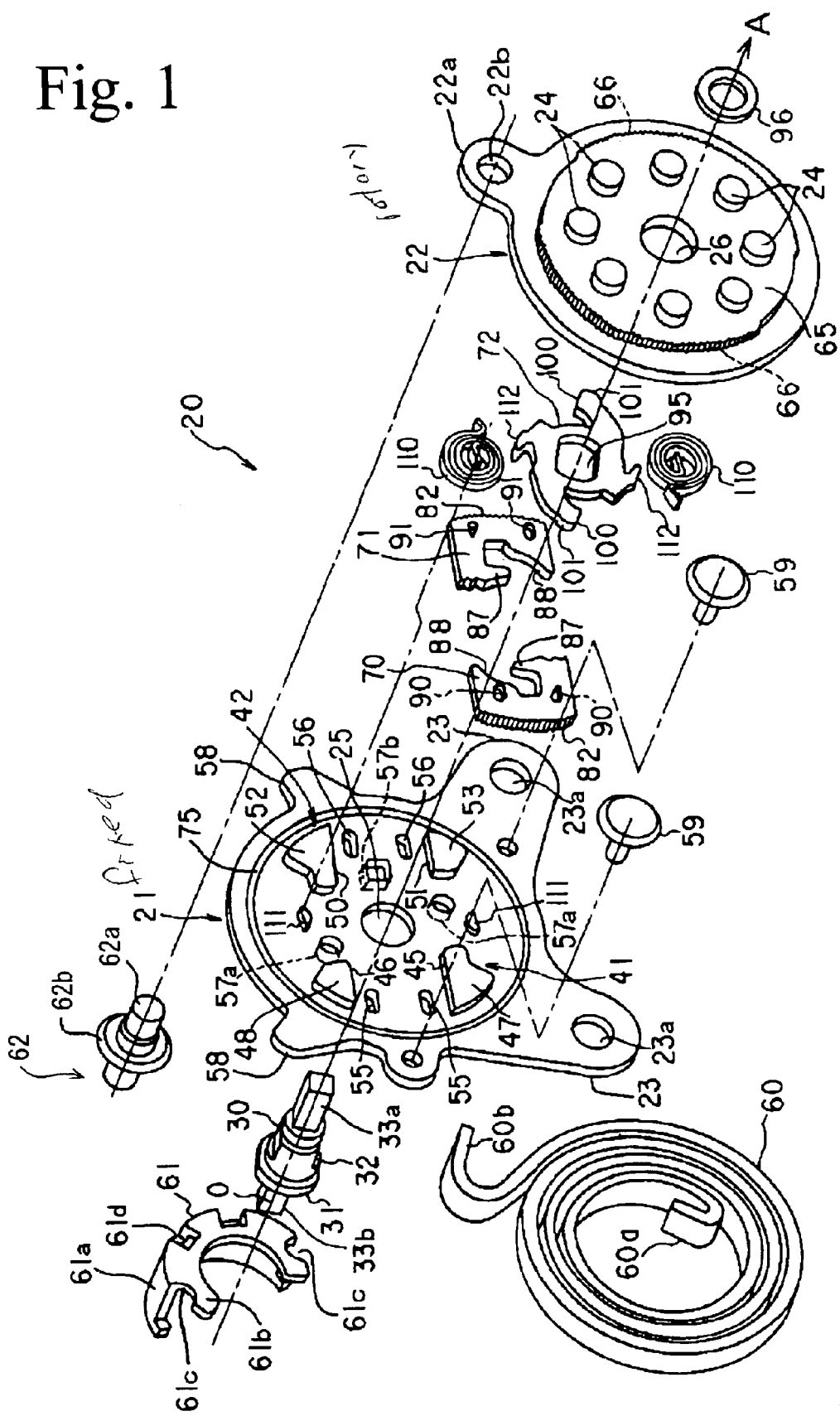
FIG. 1 is an exploded perspective view showing a left portion of a reclining apparatus in accordance with a first embodiment of the present invention.
Figure 2:
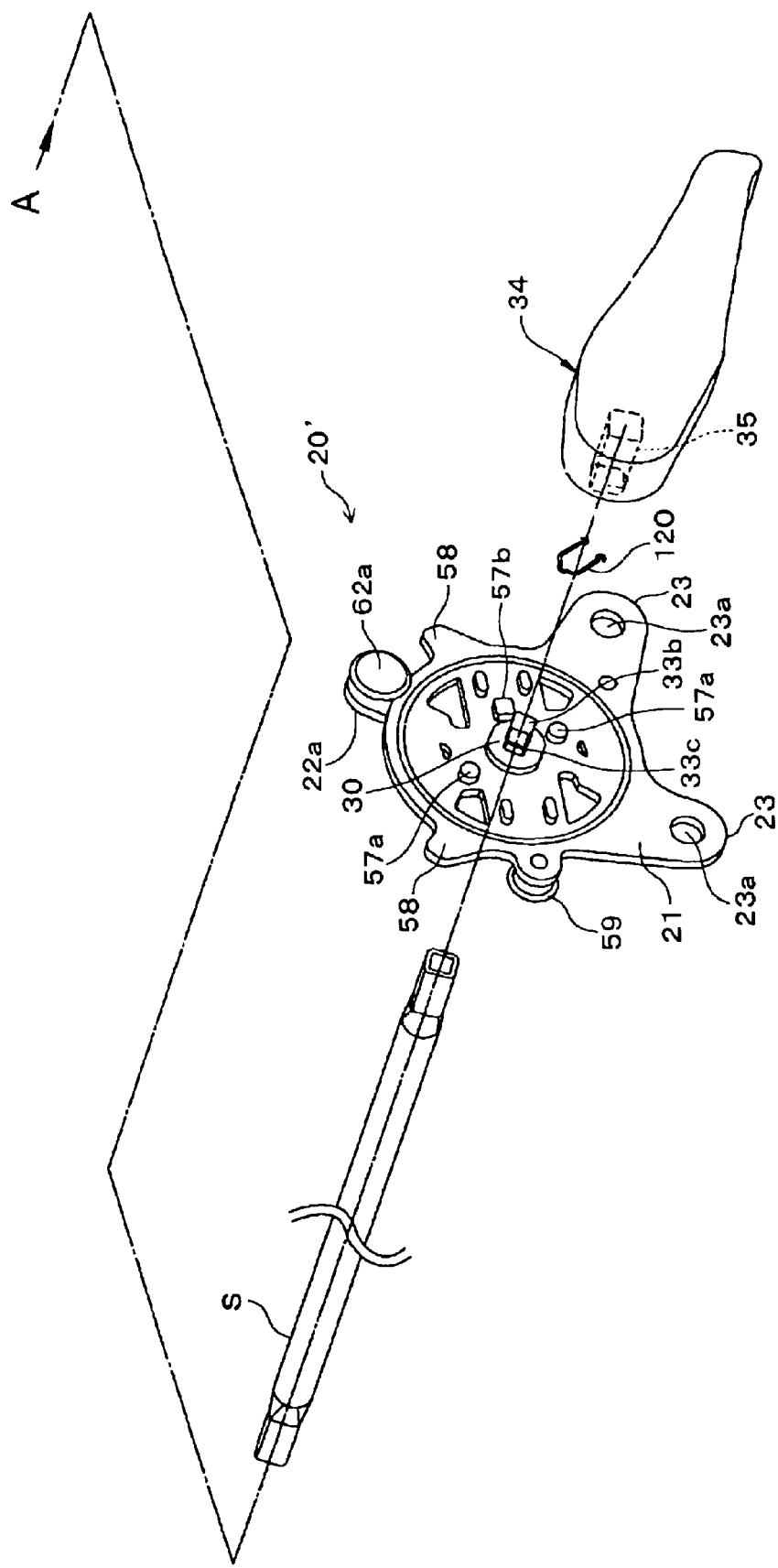
FIG. 2 is an exploded perspective view showing a right portion of the reclining apparatus in accordance with the first embodiment.

FIG. 1 is an exploded perspective view showing a reclining apparatus 20 in a left side toward a forward moving direction in a seat for an automobile, and FIG. 2 shows a right reclining apparatus 20'. These two reclining apparatuses 20 and 20' are manufactured in a mirror image manner. The reclining apparatus 20 shown in FIG. 1 is provided with a fixed plate 21 fixed to a frame of a cushion (a sitting portion) of a seat in the automobile or the like, and a rotary plate 22 provided on the fixed plate 21. Both of the fixed plate 21 and the rotary plate 22 correspond to a press molded product made of a metal or a forged product in accordance with a cold forging or the like.

Figure 3:
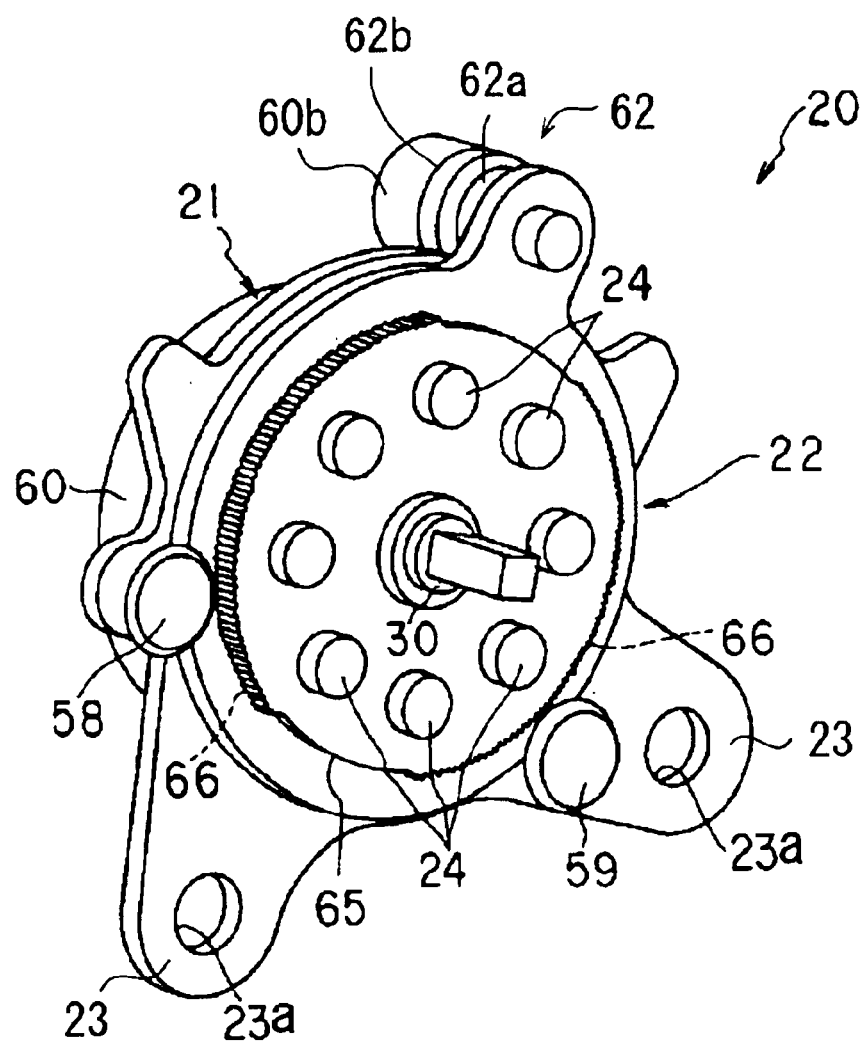
FIG. 3 is a perspective view of a condition of assembling the reclining apparatus shown in FIG. 1.

A hole 23a inserting a bolt or the like for mounting to a frame in a seat cushion side therethrough is formed in the fixed plate 21. A fixing convex portion 24 protruded to an outer surface side in accordance with a press molding is formed in the rotary plate 22, and is fixed to the seat back by welding the fixing convex portion 24 to a frame 27 in the seat back side as shown in FIG. 3.

Through holes 25 and 26 are formed in respective center portions of the fixed plate 21 and the rotary plate 22. A shaft 30 is inserted to the through holes 25 and 26 in a horizontal direction. The shaft 30 has a flange-like end portion 31, a cam mounting portion 32 having a non-circular cross section, a lever mounting portion 33 and the like. An operating lever 34 (shown in FIG. 4) for canceling the lock is mounted to the lever mounting portion 33. The shaft 30 freely rotates around an axis O (shown in FIGS. 1 and 3) thereof.

A first guide portion 41 and a second guide portion 42 punched out so as to protrude to an inner side (a right side in FIG. 3) by the press molding are provided in the fixed plate 21. The first guide portion 41 has convex portions 47 and 48 including a pair of substantially parallel guide walls 45 and 46 opposing to each other. The second guide portion 42 has convex portions 52 and 53 including a pair of substantially parallel guide walls 50 and 51 opposing to each other.

A pair of slits 55 recessed toward an outer side (a left side in FIG. 3) by a press molding are provided between the first guide walls 45 and 46. A pair of slits 56 recessed toward an outer side by a press molding are also provided between the second guide walls 5 and 51. Furthermore, a pair of positioning convex portions 57 punched out to an outer side by a press molding are provided near the center through hole 25. The following bracket 61 is fixed to the positioning convex portions 57.

The first convex portions 47 and 48 and the second convex portions 52 and 53 are both formed in a diverging shape such as a width is expanded toward an outer peripheral side of the fixed plate 21. By forming the convex portions 47, 48, 52 and 53 in the diverging shape mentioned above, it is possible to widely improve a supporting strength against slide gears 70 and 71 mentioned below in the case of assuming the rear-end collision.

The rotary plate 22 is relatively rotate around the shaft 30 with respect to the fixed plate 21 freely. In order to restrict the rotational range of the rotary plate 22, stoppers 58 and 58 are provided in the fixed plate 21. A torque (a torque in a direction of tilting the seat back forward) around the shaft 30 is applied to the rotary plate 22 by a torque generating spring 60 such as a spiral spring or the like. The bracket 61 provided in a center portion of the torque generating spring 60 is fixed by the positioning convex portion 57 in a condition that a rotation preventing is provided at a predetermined position of the fixed plate 21. An end portion 60a in an inner side of the torque generating spring 60 is engaged with the bracket 61. An outer end portion 60b of the torque generating spring 60 is engaged with a spring receiving member 62 of the rotary plate 22 in a condition of twisting the spring 60.

An offset processed portion 65 protruded toward an outer side (a right side in FIG. 3) substantially in a circular shape is formed in the rotary plate 22. That is, the offset processed portion 65 is formed in a shape in which a surface opposing to the fixed plate 21 is recessed. An internal gear 66 is formed in an inner peripheral portion of the offset processed portion 65. The internal gear 66 is formed along a circular arc around the through hole 26 through which the shaft 30 passes.

A pair of slide gears 70 and 71 and a cam member 72 are received between the fixed plate 21 and the rotary plate 22, that is, in a space portion inside the offset processed portion 65. The slide gears 70 and 71 are formed in a common shape to each other. One slide gear 70 has linear side surfaces 75 and 76 substantially parallel to each other and extending along the first guide walls 45 and 46, and another slide gear 71 has linear side surfaces 77 and 78 substantially parallel to each other and extending along the second guide walls 50 and 51.

Figure 4:
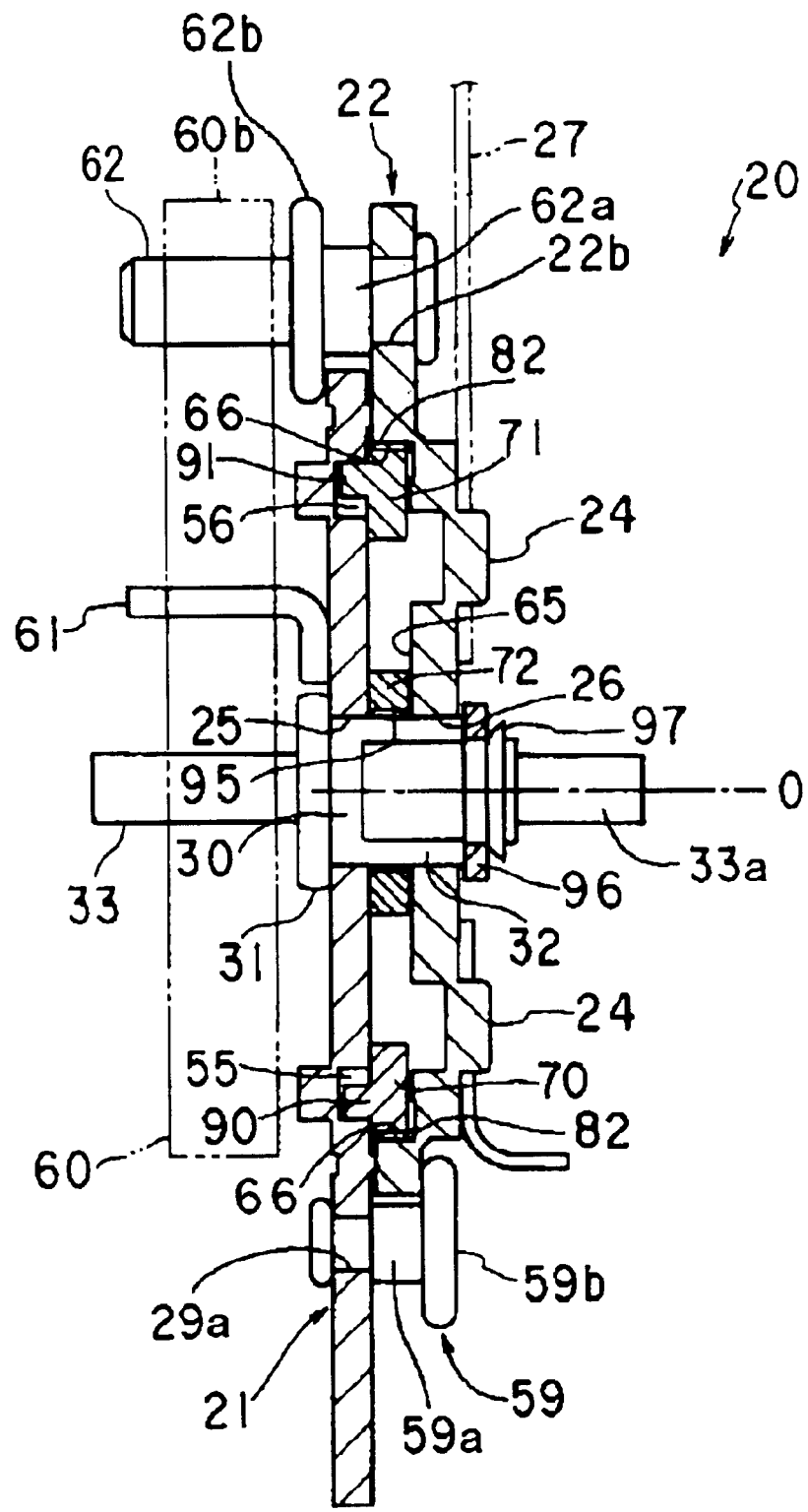
FIG. 4 is a vertical cross sectional view of the reclining apparatus shown in FIG. 1.

One slide gear 70 can move along the first guide walls 45 and 46, and another slide gear 71 can move along the second guide walls 50 and 51. As shown in FIG. 4, a slight gap 80 is secured between both side surfaces 75 and 76 in one slide gear 70 and the guide walls 45 and 46. A slight gap 81 is also secured between both side surfaces 77 and 78 in another slide gear 71 and the guide walls 50 and 51.

Figure 8:
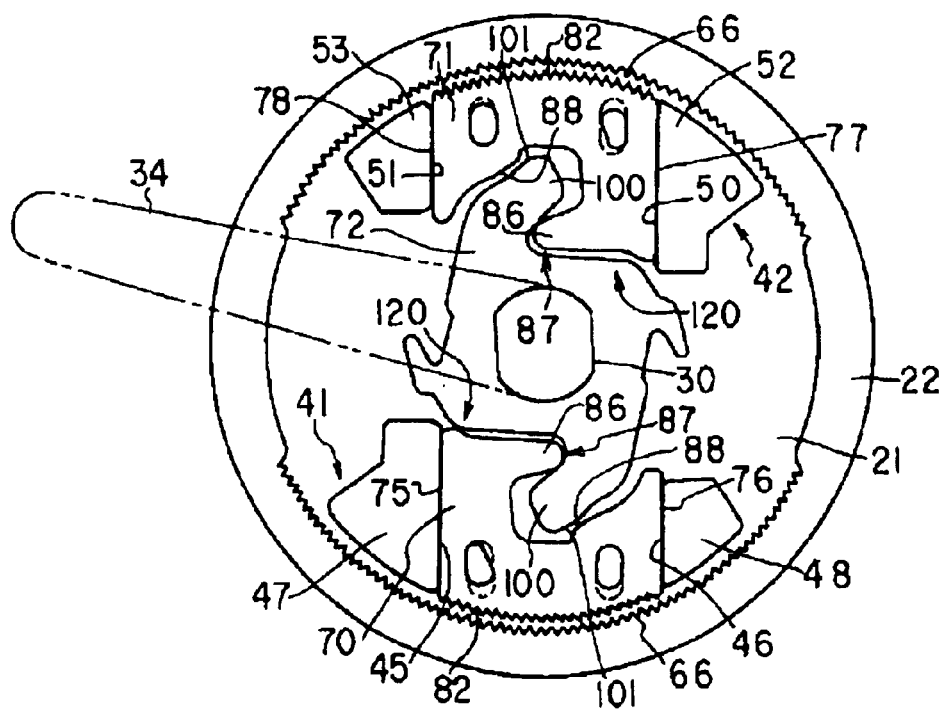
FIG. 8 is a side view of a lock canceling condition of the reclining apparatus shown in FIG. 1.
Figure 9:
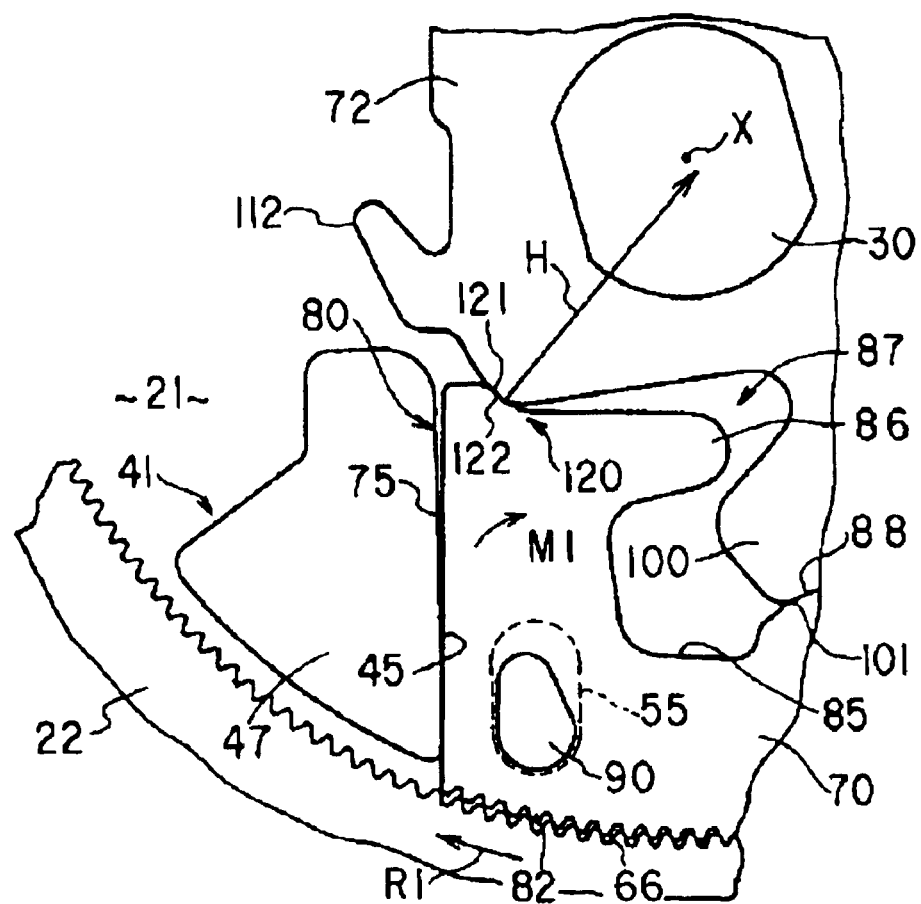
FIG. 9 is an enlarged view of a part of the reclining apparatus shown in FIG. 1.

A gear teeth portion 82 freely engaging and disengaging with the internal gear 66 is provided in front end portions of the slide gears 70 and 71. As shown in FIG. 8 in an enlarged manner, a receiving portion 87 including a recess portion 85 and a convex portion 86 to which a hook portion 100 mentioned below is inserted, and a cam surface 88 pressed by a cam surface 101 of a cam member 72 at a time of being in a lock condition are formed in a side of base ends of the slide gears 70 and 71.

Convex portions 90 and 91 are provided in the slide gears 70 and 71. The convex portions 90 and 91 are inserted to the slits 55 and 56, and the slide gears 70 and 71 can move to the lock position and the lock canceling position in a direction being along the slits 55 and 56. By fitting the convex portions 90 and 91 to the slits 55 and 56, the strength of the guide portions 41 and 42 is widely improved against the load input to the slide gears 70 and 71 in the case of assuming the rear-end collision or the like.

The cam member 72 has a hole 95 in a center portion thereof, the cam member 32 of the shaft 30 is inserted to the hole 95, and it is possible to prevent the cam member 72 from moving out from the shaft 30, by a washer 96 and a caulked portion 97 (shown in FIG. 3). A pair of hook portions 100 are provided in the cam member 72 in a positional relation having 180 degrees with each other. The hook portion 100 is inserted to the recess portion 85 of each of the receiving portions 87 in the slide gears 70 and 71. A pair of cam surfaces 101 capable of being in contact with the respective cam surfaces 88 of the slide gears 70 and 71 are provided in the cam member 72 at positions having 180 degrees with each other. The cam surface 101 is in contact with the cam surfaces 88 in the slide gears 70 and 71 when the cam member 72 is located at the lock position shown in FIG. 4, thereby pressing the slide gears 70 and 71 toward the internal gear 66.

Figure 6:
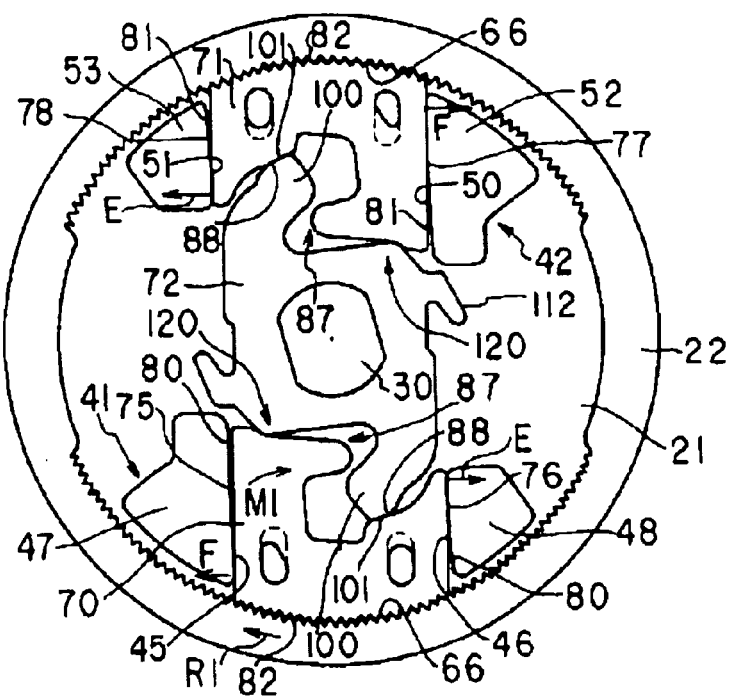
FIG. 6 is a side view of a part of the apparatus when a backward load is applied to the reclining apparatus shown in FIG. 1.
Figure 7:
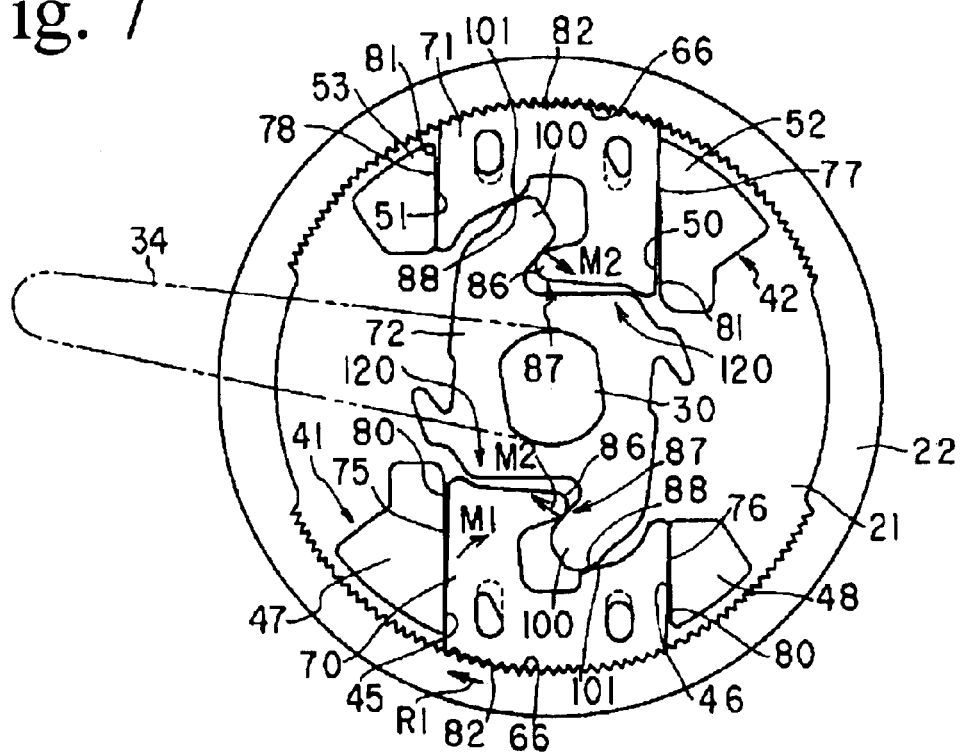
FIG. 7 is a side view when a cam member of the reclining apparatus shown in FIG. 1 operates in a lock canceling direction.

The hook portion 100 of the cam member 72 rotates in a clockwise direction in a condition of engaging with the convex portion 86 of the receiving portion 87 in the slide gears 70 and 71 when the cam member 72 rotates in the lock canceling direction shown in FIGS. 6 and 7, thereby being formed in a shape capable of drawing the slide gears 70 and 71 close to the shaft 30. However, the receiving portion 87 and the hook portion 100 are formed in a shape displacing the slide gears 70 and 71 in an opposite direction (a direction shown by an arrow M2 in FIG. 6) to a rotational moment M1 applied to the slide gears 70 and 71 due to a backward load applied to the seat back, when the cam member 72 rotates in the lock canceling direction.

The receiving portion 87 of one slide gear 70 and the hook portion 100 are provided in the inner area of both of the side surfaces 75 and 76 in the slide gear 70. Furthermore, a portion at which the receiving portion 87 and the hook portion 100 are in contact with each other is positioned near a center line Y (shown in FIG. 4) of the slide gear 70. The receiving portion 87 of another slide gear 71 and the hook portion 100 are also provided in the inner area of both of the side surfaces 77 and 78 in the slide gear 71, and a portion at which they are in contact with each other is positioned near the center line Y of the slide gear 71.

The cam member 72 is always urged to a direction of the lock position (a counterclockwise direction in FIG. 4) by a return spring 110 shown in FIG. 1. In the case of the illustrated embodiment, two return springs 110 are used, and are set between a spring hooking portion 111 provided in the fixed plate 21 and a spring receiving portion 112 provided in the cam member 72 in a condition of being twisted so as to generate a torque urging the cam member 72 in the direction of the lock position.

A supporting portion 120 is provided at a portion in which the slide gears 70 and 71 and the cam member 72 are opposed to each other. The supporting portion 120 carries out a function of preventing the slide gears 70 and 71 from moving in the direction of the rotational moment M1 applied to the slide gears 70 and 71 due to the backward load applied to the seat back. As shown in FIG. 8 in a manner that one portion is enlarged, the supporting portion 120 has inclined surfaces 121 and 122 which are in contact with each other so as to urge the cam member 72 in the direction of the lock position when the rotational moment M1 is applied to the slide gears 70 and 71. One inclined surface 121 is provided in the slide gears 70 and 71. Another inclined surface 122 is provided in an outer peripheral portion of the cam member 72. A line segment (a perpendicular line) H extending in a direction vertical to the contact surface of the inclined surfaces 121 and 122 is directed in a direction shifted to a side of the cam surfaces 88 and 101 rather than a center x of rotation of the cam member 72 (that is, a center of the shaft 30).

Next, a description will be given of an operation of the reclining apparatus 20 having the structure mentioned above.

Figure 5:
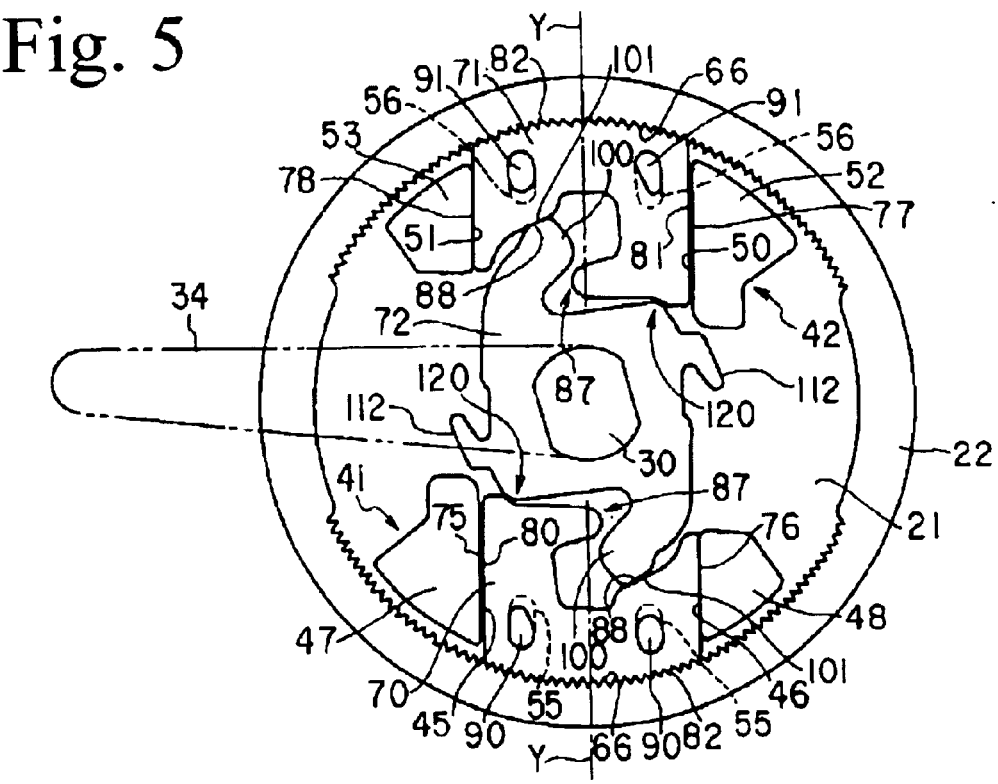
FIG. 5 is a side view of a part of the apparatus when the reclining apparatus shown in FIG. 1 is in a locking condition.

In the lock condition shown in FIG. 4, the slide gears 70 and 71 are pressed to the internal gear 66 by the cam surface 101 of the cam member 72, and the internal gear 66 and the gear teeth portion 82 of the slide gears 70 and 71 are engaged with each other, whereby the rotary plate 22 is fixed to the fixed plate 21. That is, the seat back becomes in a condition of being fixed. FIG. 5 shows a condition that the load (the backward load of the seat back) applied from an upper body of the sitting person enters into the rotary plate 22. In this case, since the slide gears 70 and 71 engaging with the internal gear 66 rotate in the same direction as that of the rotary plate 22 (a direction shown by an arrow R1), a clockwise moment M1 is generated in the slide gears 70 and 71. Accordingly, the first slide gear 70 is pressed to the convex portions 47 and 48 in contact points E and F with respect to the guide walls 45 and 46, and the second slide gear 71 is also pressed to the convex portions 52 and 53 in contact points F and E with respect to the guide walls 50 and 51.

When the operating lever 34 is operated in the lock canceling direction under this condition, the convex portion 86 of the receiving portion 87 is pressed in a counterclockwise direction by the hook portion 100 as shown in FIG. 6, and a moment M2 in a direction of canceling the rotational moment M1 of the slide gears 70 and 71 is applied to the slide gears 70 and 71. Accordingly, a contact pressure of the slide gears 70 and 71 against the guide walls 45, 46, 50 and 51 is reduced, and the slide gears 70 and 71 can move apart from the internal gear 66 due to a small lock canceling force.

In the manner mentioned above, as shown in FIG. 7, the engagement between the internal gear 66 and the gear teeth portion 82 is canceled. In this lock canceling condition, since the restriction of the rotary plate 22 due to the slide gears 70 and 71 is canceled, the rotary plate 22 can rotate around the shaft 30 with respect to the fixed plate 21.

When the operating force of the operating lever 34 is canceled after adjusting a tilt angle of a back in the lock canceling condition mentioned above, the cam member 72 returns to the lock position shown in FIG. 4 due to an elastic force of the return spring 110 and the operating lever 34 returns to the original position, whereby the slide gears 70 and 71 engage with the internal gear 66 and the rotary plate 22 is fixed. In the case of assuming the rear-end collision or the like under the lock condition shown in FIG. 8, the inclined surfaces 121 and 122 of the supporting portion 120 are in contact with each other, thereby preventing the slide gears 70 and 71 from moving in the direction of the rotary moment M1.

Second Embodiment

A description will be given of a second embodiment in accordance with the present invention with reference to FIGS. 1 to 4 and FIGS. 10 to 12. A reclining apparatus in accordance with the second embodiment has substantially the same structure as that of the first embodiment mentioned above, however, is different therefrom in the following points.

That is, a pair of round type positioning convex portions 57a and a pair of rectangular type positioning convex portions 57b which are protruded outward in accordance with a press molding are provided near the center through hole 25 of the fixed plate 21. The round type positioning convex portions 57a are arranged at positions symmetrical with each other with respect to the axis O, and the round type positioning convex portions 57a and the rectangular type positioning convex portions 57b are apart from the axis O with the same distance. Furthermore, the bracket 61 is fixed to the round type positioning convex portions 57a and the rectangular type positioning convex portions 57b.

Figure 11:
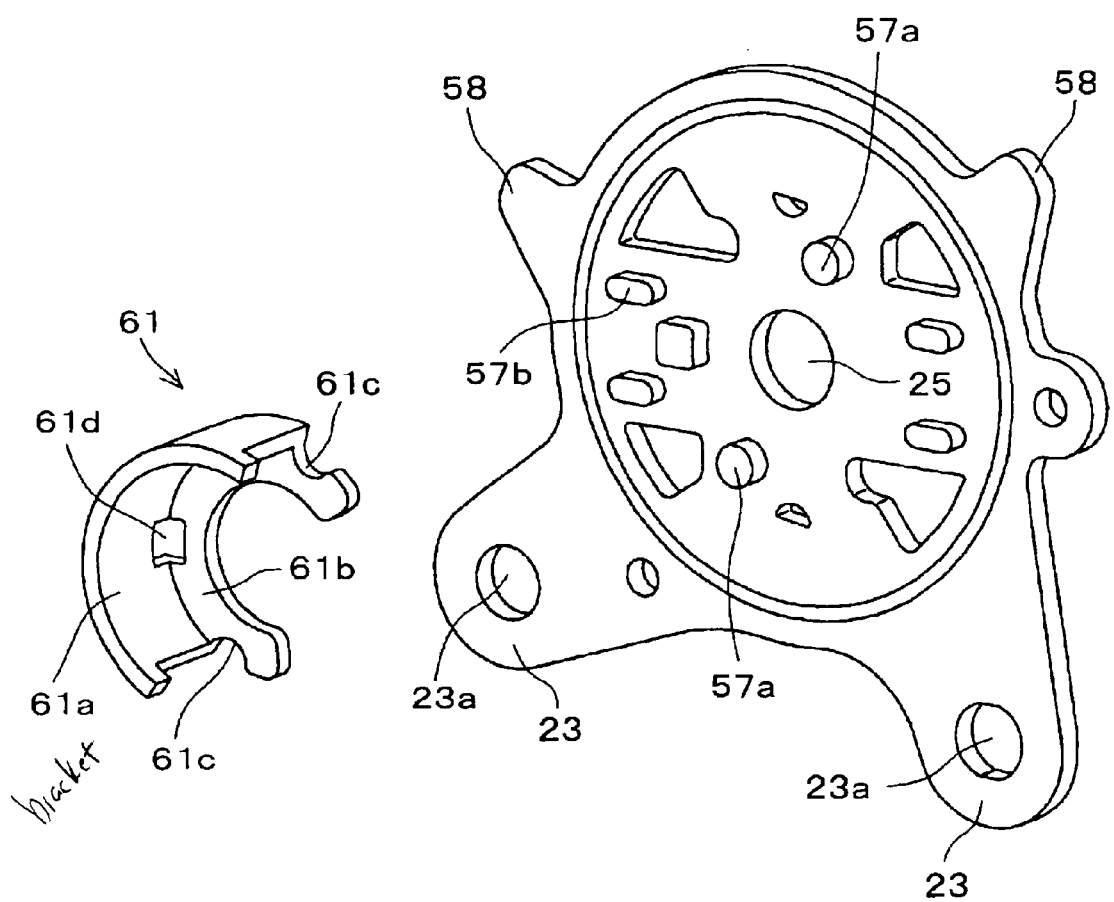
FIG. 11 is a perspective view showing a condition before fixing a bracket to a part of the reclining apparatus shown in FIG. 1.
Figure 12:
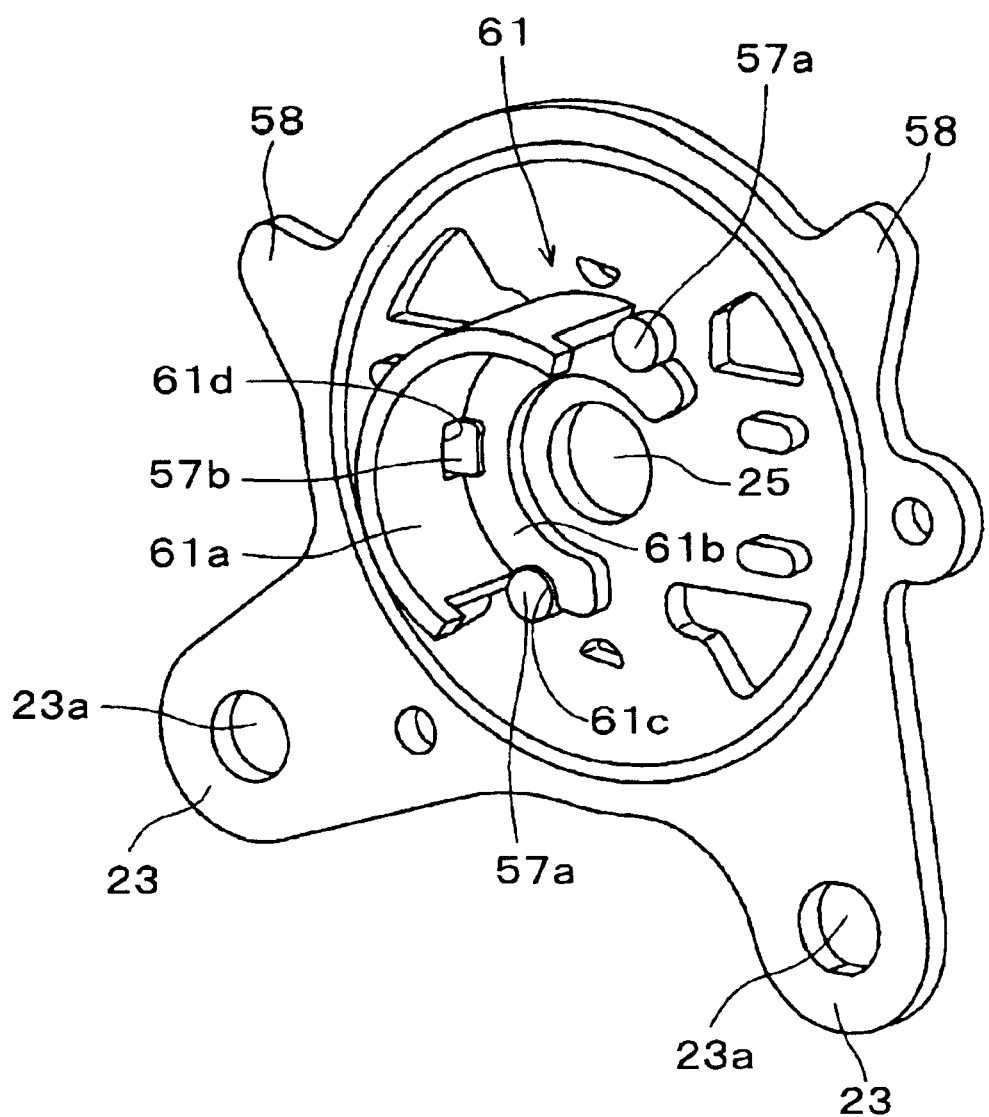
FIG. 12 is a perspective view showing a condition of fixing the bracket after the condition shown in FIG. 11.

The bracket 61 is constituted by a vertical plate portion 61a formed in a substantially semicircular tube shape, and a bottom plate portion 61b extending toward an inner peripheral side from the vertical plate portion 61a. A plurality of notches 61c and 61d extending to the vertical plate portion 61a and the bottom plate portion 61b are formed in a crossing portion between the vertical plate portion 61a and the bottom plate portion 61b. The notch 61c is formed in a semicircular shape and is fitted to the round type positioning convex portion 57a in the fixed plate 21. The notch 61d is formed in a rectangular shape and is fitted to the rectangular type positioning convex portion 57b. Furthermore, by welding the notches 61c and 61d to the positioning convex portions 57a and 57b, the bracket 61 is fixed to the fixed plate 21 in a condition that the rotation prevention is given. In this case, FIGS. 11 and 12 show the fixed plate 21 and the bracket 61 in the right reclining apparatus 20.

A flange portion 22a protruding to an outer peripheral side is formed in the rotary plate 22, and a holding member 62 is fixed to a hole 22b formed in the flange portion 22a. on the contrary, the stoppers 58 and 58 protruding to the outer peripheral side are integrally formed in the fixed plate 21, and the holding member 62 is brought into contact with the stopper 58, whereby a rotating range of the rotary plate 22 is limited. The spiral spring 60 is mounted so that the bracket 61 is received in the center space portion thereof, and the end portion 60a in the inner peripheral side thereof is engaged with the vertical plate portion 61a of the bracket 61. Furthermore, the end portion 60b in the outer peripheral side of the spiral spring 60 is engaged with the holding member 62 in a condition of twisting the spring 60. Accordingly, a torque around the shaft 30 (a torque in a direction of forward tilting the seat back) is applied to the rotary plate 22.

In this case, a flange 62b is formed in a center portion of the holding member 62, and the fixed plate 21 is held between the flange 62b and the rotary plate 22. Furthermore, a pin 59 having a flange-shaped head portion is fixed to the fixed plate 21 along the outer periphery of the rotary plate 22, and the rotary plate 22 is held between the head portion of the pin 59 and the fixed plate 21. The holding member 62 and the pins 59 and 59 are arranged at three portions in the circumferential direction, and when the load moving the fixed plate 21 apart from the rotary plate 22 is applied, supports the load so as to prevent both the elements from moving apart from each other. Furthermore, a linear protrusion 75 formed in a circular arc shape around the axis O is formed on a surface of the fixed plate 21 in the side of the rotary plate 22, whereby the structure is made such that the rotary plate 22 is in slidable contact with a surface of the linear protrusion 75.

Figure 10:
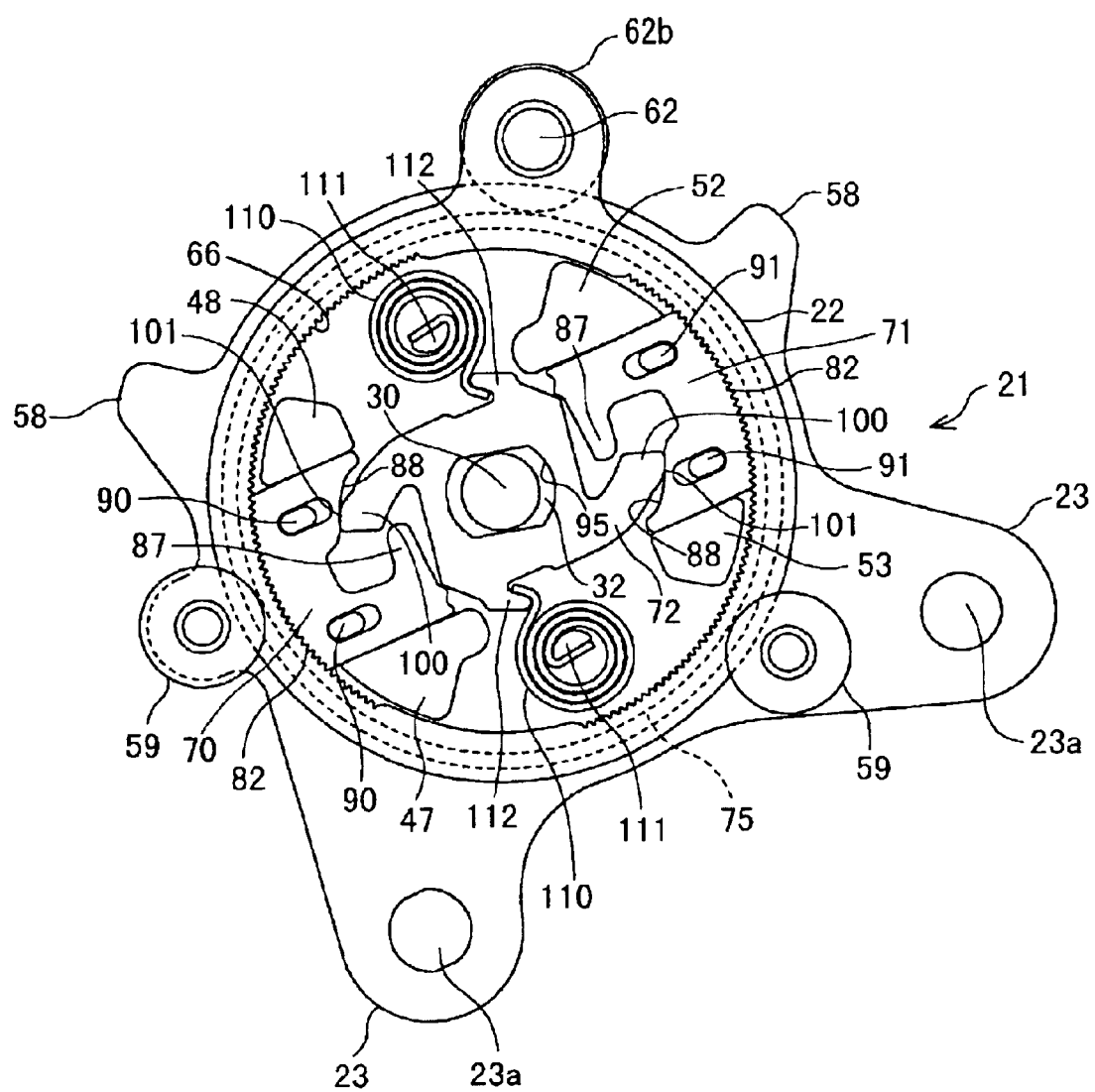
FIG. 10 is a cross sectional view showing a condition of cutting a reclining apparatus in accordance with a second embodiment of the present invention at a portion of an internal gear of a rotary plate.

The hook 100 of the cam member 72 is engaged with the convex portion 87 of the slide gears 70 and 71 so as to draw the slide gears 70 and 71 in a direction moving close to the shaft 30, when the cam member 72 rotates in the lock canceling direction in the counterclockwise direction in FIG. 10. The cam member 72 having the structure mentioned above is always urged in a direction of the lock position (in a clockwise direction in FIG. 10) by the return spring 110 shown in FIG. 1. In the case of the illustrated embodiment, two return springs 110 are used, and are respectively set between the spring hooking portion 111 formed in the fixed plate 21 and the spring receiving portion 112 formed in the cam member 72 in a condition of being twisted so as to generate a torque urging the cam member 72 in the direction of the lock position.

As shown in FIG. 2, in the right reclining apparatus, a groove 33c is formed in an outer periphery of a lever mounting portion 33b in the shaft 30, and a snap ring 120 is mounted to the groove 33c. On the contrary, a mounting hole 35 extending in a thickness direction is formed in the operating lever 34, and a groove (not shown) to which the snap ring 120 is fitted is formed in an inner periphery of the mounting hole 35. Accordingly, when the lever mounting portion 33b is inserted to the mounting hole 35 of the operating lever 34, both the elements are combined by the snap ring 120. In this case, in this embodiment, the bracket 61 and the spiral spring 60 are not attached to the reclining apparatus 20' in FIG. 2, however, it is possible to attach the bracket 61 and the spiral spring 60 only to the reclining apparatus 20' in FIG. 2, or it is possible to attach to both of the reclining apparatuses 20 and 20'.

In accordance with the reclining apparatus 20 having the structure mentioned above, since the bottom plate portion 61b of the bracket 61 extends toward the shaft 30 from the edge portion of the vertical plate portion 61a, the flange protruding outward such as the bracket formed in a hat-shape is not provided, so that it is possible to make the bracket 61 small. Furthermore, since a plurality of notches 61c and 61d extending to the vertical plate portion 61a and the bottom plate portion 61b are formed in the crossing portion there between and the convex portions 57a and 57b fitting to the notches 61c and 61d are formed in the fixed plate 21, the load applied by the spiral spring 60 engaged with the vertical plate portion 61a is supported by the convex portions 57a and 57b located immediately below the vertical plate portion 61a. Accordingly, it is possible to set the design strength of the vertical plate portion 61a to be small and it is possible to make the thickness of the bracket 61 thin. Furthermore, since the load of the spiral spring 60 is supported by the convex portions 57a and 57b, it is sufficient to weld so as to fix the bracket 61 to the fixed plate 21 to such a degree that the bracket 61 does not break away from the fixed plate 21. Accordingly, it is possible to simplify the welding of the bracket 61 to the fixed plate 21, and it is easy to control a quality thereof.

In particular, in the second embodiment mentioned above, since the holding member 62 fixed to the outer peripheral portion of the rotary plate 22 have three functions comprising: (1) mounting the spiral spring 60, (2) preventing the fixed plate 21 and the rotary plate 22 from breaking away from each other, and (3) restricting the rotational range of the rotary plate 22, it is possible to reduce the number of the parts. Furthermore, in accordance with the embodiment mentioned above, since the linear protrusion 75 slidably contacting with the rotary plate 22 is formed in the fixed plate 21, it is possible to reduce a frictional resistance while closely attaching both the elements.

Third Embodiment

A description will be given of an embodiment in accordance with the present invention with reference to FIGS. 1 to 4 and FIGS. 10 to 13. A reclining apparatus in accordance with a third embodiment has substantially the same structure as that of the first embodiment mentioned above, however, is different therefrom in the following points.

Figure 13:
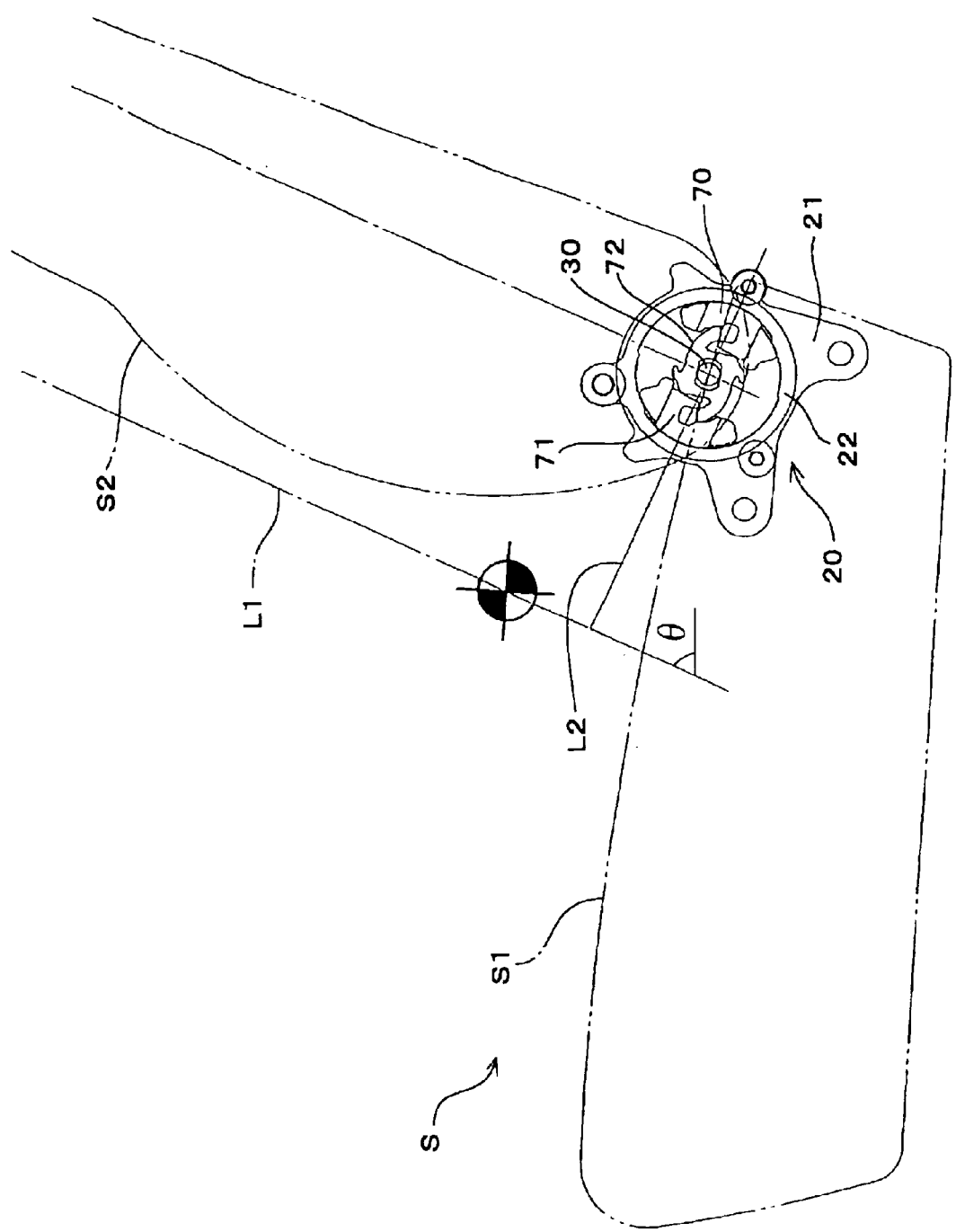
FIG. 13 is a side view showing a condition that a reclining apparatus in accordance with a third embodiment of the present invention is attached to a seat.
Figure 14:
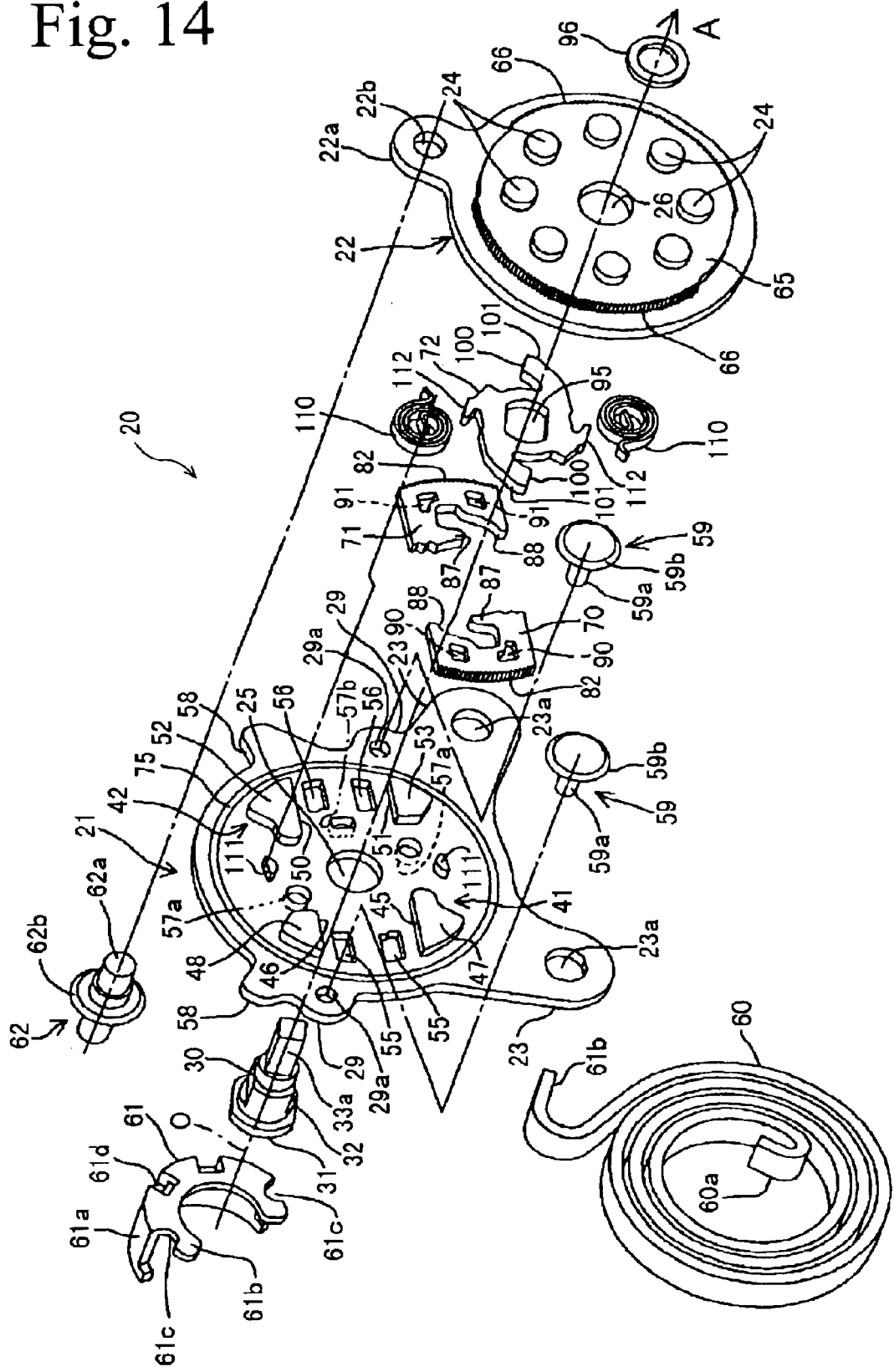
FIG. 14 is an exploded perspective view showing a left portion of a reclining apparatus in accordance with a fourth embodiment of the present invention.
Figure 15:
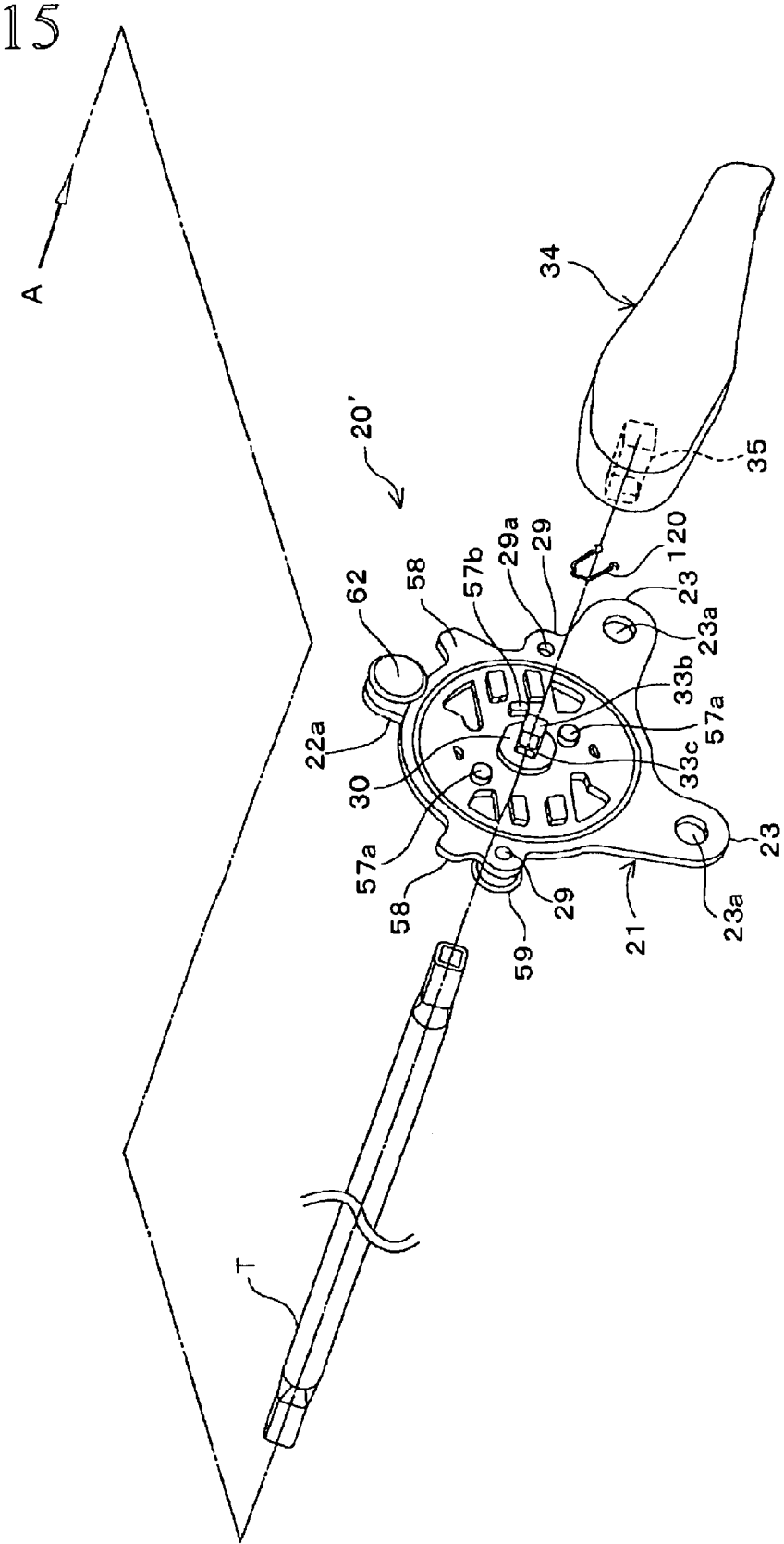
FIG. 15 is an exploded perspective view showing a right portion of the reclining apparatus in accordance with the fourth embodiment.

That is, a reclining apparatus 20 (20') in accordance with the third embodiment is arranged such that in a condition that the fixed plate 21 is fixed to a seat cushion S1, as shown in FIG. 13, one slide gear 71 is arranged forward and another slide gear 70 is arranged backward. In this case, the reclining apparatus 20 in FIG. 13 is illustrated by seeing through the slide gears 70 and 71 and the cam member 72. These slide gears 70 and 71 are arranged forward and backward so that a moving direction thereof is inclined in a slightly forward ascending direction, and a center of each of the gear teeth portions 82 engaging with the internal gear 66 vertically crosses a line L1 extending along a standard tilt angle θ of the seat back S2 and is positioned on a line L2 passing through the center of the shaft 30 corresponding to the center of rotation of the rotary plate 22.

In accordance with the reclining apparatus 20 (20') mentioned above, the slide gears 70 and 71 are arranged in a longitudinal direction, and the center of each of the gear teeth portions 82 engaging with the internal gear 66 vertically crosses the line L1 extending along the standard tilt angle θ of the seat back S2 and is positioned on the line L2 passing through the center of the shaft 30 corresponding to the center of rotation of the rotary plate 22. Accordingly, the loads applied to the slide gears 70 and 71 are the same between the both. This is proven by the formula (2) mentioned above. Therefore, it is possible to design a pair of slide gears 70 and 71, and the respective guide portions 41 and 42 (the convex portions 47 and 48 and the convex portions 52 and 53) supporting the slide gears 70 and 71 under the same load condition, so that it is possible to commonly use the parts. Furthermore, as mentioned above, the load applied to the engaging position of the slide gears 70 and 71 in accordance with the present embodiment in which the slide gears are arranged longitudinally is smaller than the load applied to the upper side engaging position in the conventional structure in which the slide gears are vertically arranged. Accordingly, it is possible to make the structure compact and light, and it is possible to improve the strength.

Figure 23A:
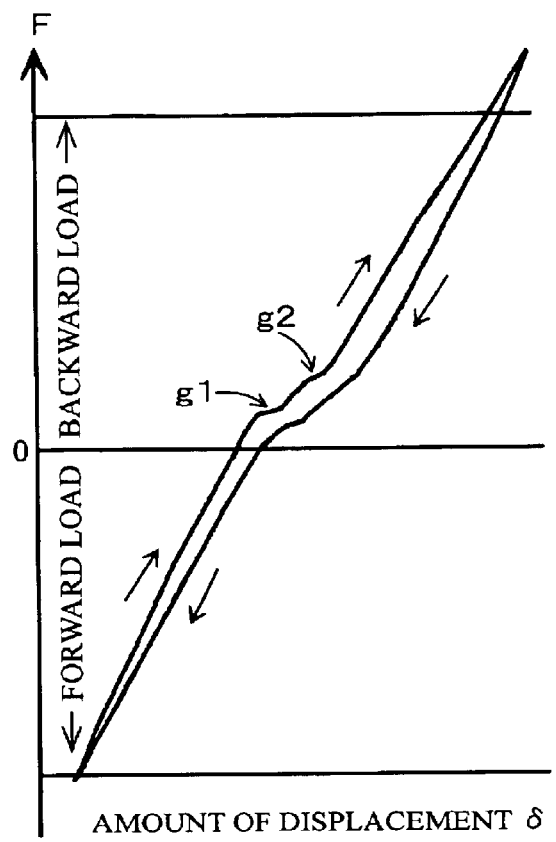
FIG. 23A is a graph showing an amount of displacement of a seat back at a time of applying forward and backward loads to the conventional reclining apparatus.
Figure 23B:
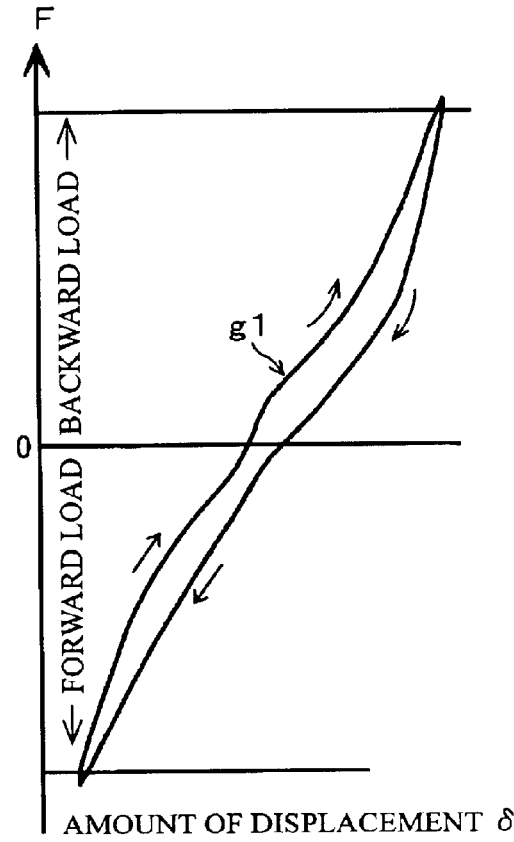
FIG. 23B is a graph showing an amount of displacement of a seat back at a time of applying forward and backward loads to the reclining apparatus in accordance with the present invention.
Figure 24A:
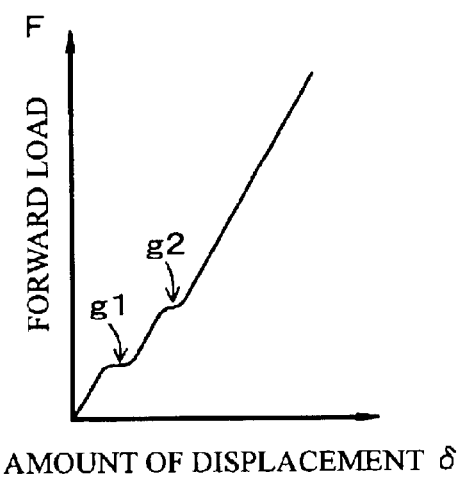
FIG. 24A is a graph showing an amount of displacement of a seat back at a time of applying a backward load to the conventional reclining apparatus.
Figure 24B:
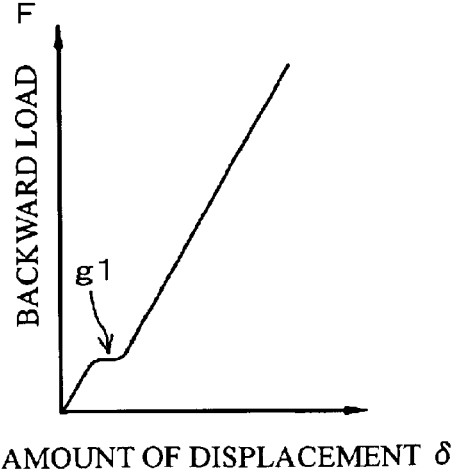
FIG. 24B is a graph showing an amount of displacement of a seat back at a time of applying a backward load to the reclining apparatus in accordance with the present invention.

Furthermore, since the load applied to a pair of slide gears 70 and 71 is uniform, the backlashes generated at the engaging positions of the slide gears 70 and 71 with respect to the internal gear 66 are simultaneously generated, so that it is possible to restrict the generation of the backlash to one time. This is as mentioned above with reference to FIGS. 23B and 24B. As a result, it is possible to restrict a sense of discomfort and an unpleasant sensation applied to the sitting person due to the generation of the backlash as much as possible.

Fourth Embodiment

A description will be given of a fourth embodiment in accordance with the present invention with reference to FIGS. 14 to 17 and FIG. 4. A reclining apparatus in accordance with the fourth embodiment has L1 substantially the same structure as that of the first embodiment, however, is different therefrom in the following points.

Comparatively small flange portions 29 are formed at two predetermined portions of the outer peripheral portion in the fixed plate 21, and a holding member 59 for preventing the rotary plate 22 from breaking away from the fixed plate 21 is provided in the flange portions 29. The L1 holding member 59 has a flange 59b in one end of a pin 59a, the pin 59a is inserted to a hole 29a formed in the flange portion 29 so as to be fixed to the fixed plate 21, as shown in FIG. 4, thereby slidably holding the outer peripheral portion of the rotary plate 22 between the fixed plate 21 and the flange 59b.

On the contrary, a holding member 62 for preventing the rotary plate 22 itself from breaking away from the fixed plate 21 is also provided in the rotary plate 22. The holding member 62 is provided in a comparatively large flange portion 22a formed at one predetermined portion of the outer peripheral portion in the rotary plate 22. The holding member 62 has a flange 62b in a middle portion in an axial direction of a pin 62a longer than the pin 59a of the holding member 59 in the side of the fixed plate 21, the pin 62a is inserted to a hole 22b formed in a flange portion 22a so as to be fixed to the rotary plate 22, as shown in FIG. 4, thereby slidably holding the outer peripheral portion of the fixed plate 21 between the fixed plate 22 and the flange 62b.

The holding members 59, 59 and 62 are arranged at three portions in a circumferential direction in a dispersed manner, and when the load breaking away the fixed plate 21 and the rotary plate 22 is applied, supports the load so as to prevent both of the plates 21 and 22 from breaking away from each other.

Furthermore, the stoppers 58 protruding to the outer peripheral side are formed at two predetermined portions of the fixed plate 21 so as to be apart from each other in the circumferential direction, and the pin 62a of the holding member 62 in the rotary plate 22 is brought into contact with the stopper 58, whereby the rotational range of the rotary plate 22 is limited. That is, the holding member 62 commonly serves as the means for restricting the rotational range of the rotary plate 22. Furthermore, the linear protrusion 75 formed in the circular arc shape around the axis 0 is formed on the surface in the side of the rotary plate 22 in the fixed plate 21, and the rotary plate 22 is made such as to be slidably in contact with the surface of the linear protrusion 75.

Figure 16:
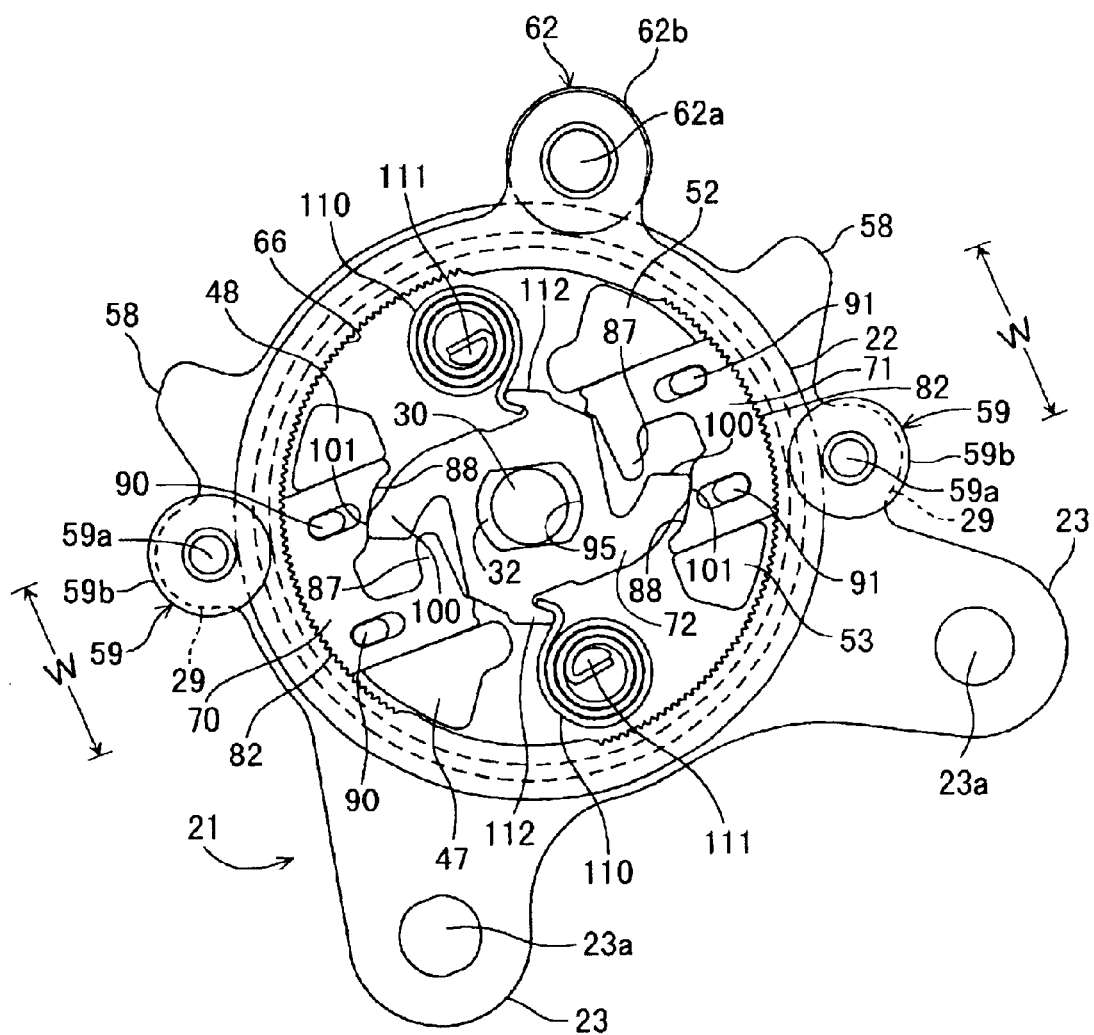
FIG. 16 is a cross sectional view showing a condition of cutting the reclining apparatus in accordance with the fourth embodiment at a portion of an internal gear of a rotary plate.
Figure 17:
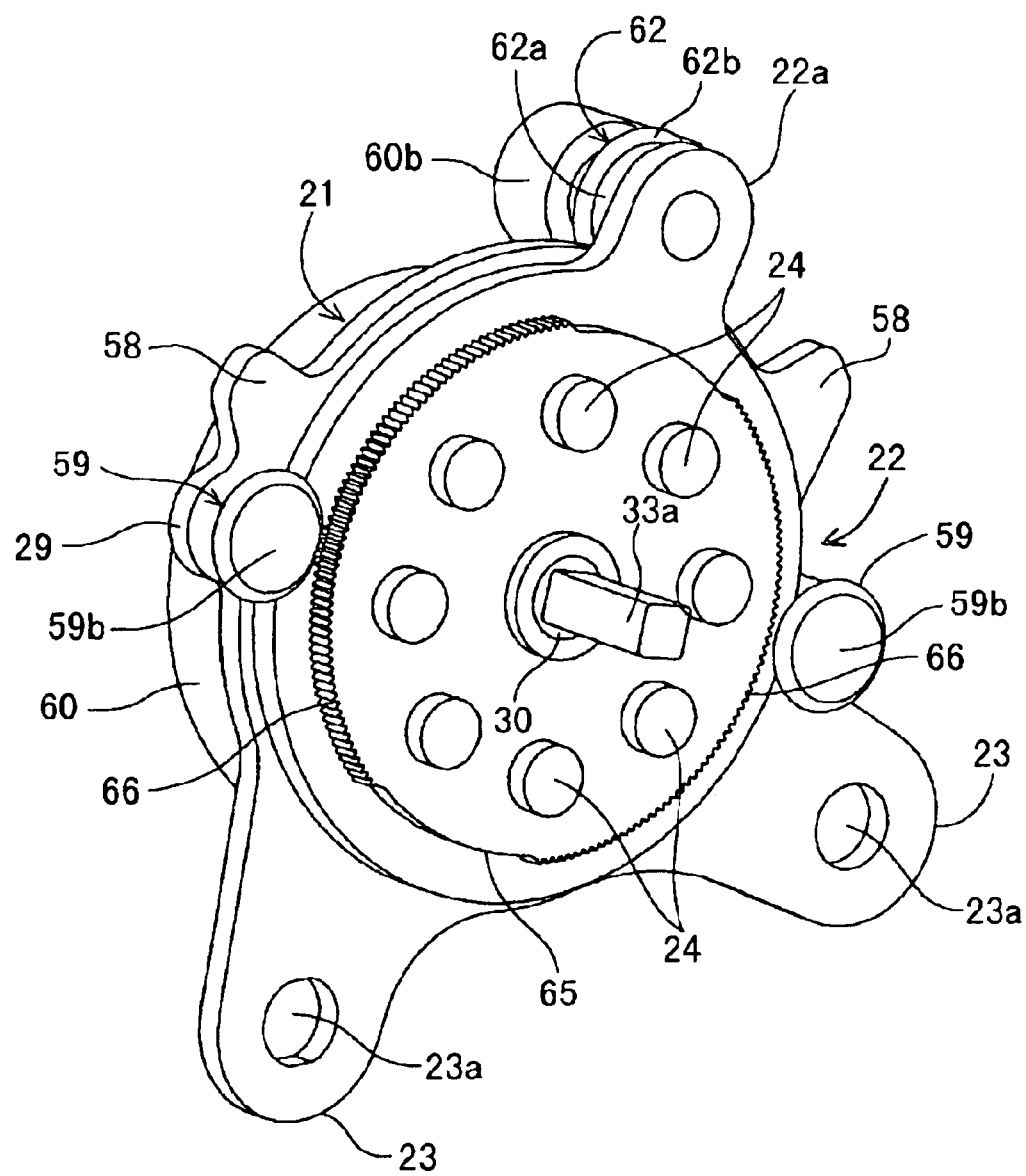
FIG. 17 is a perspective view of a condition of assembling the reclining apparatus shown in FIG. 14.
Figure 18:
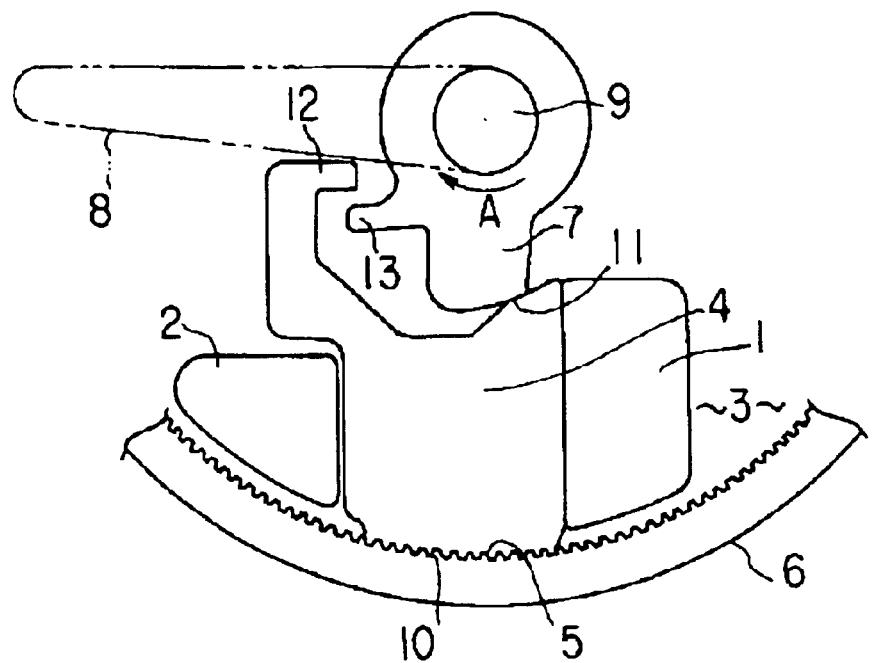
FIG. 18 is a side view of a part of a conventional internal type reclining apparatus.
Figure 19:
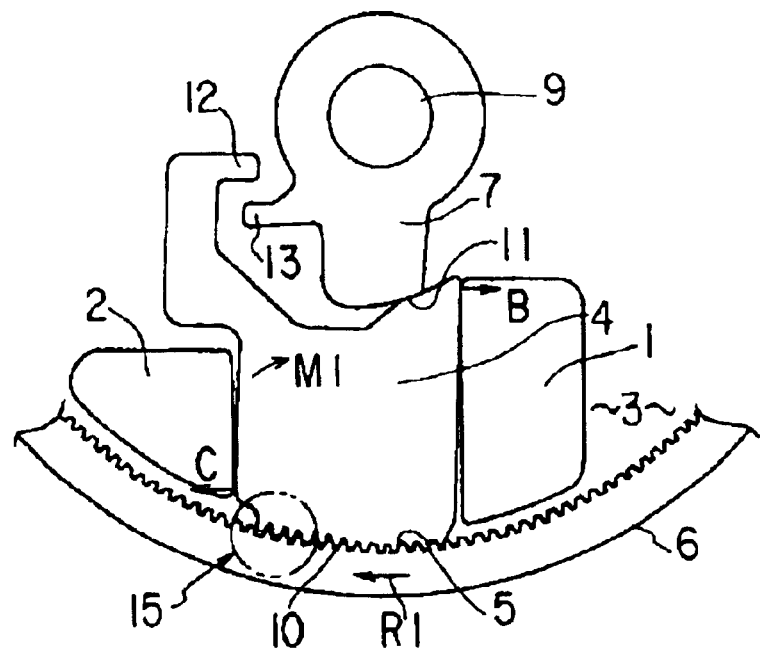
FIG. 19 is a side view of a condition that a backward load is applied to the reclining apparatus shown in FIG. 18.
Figure 20:
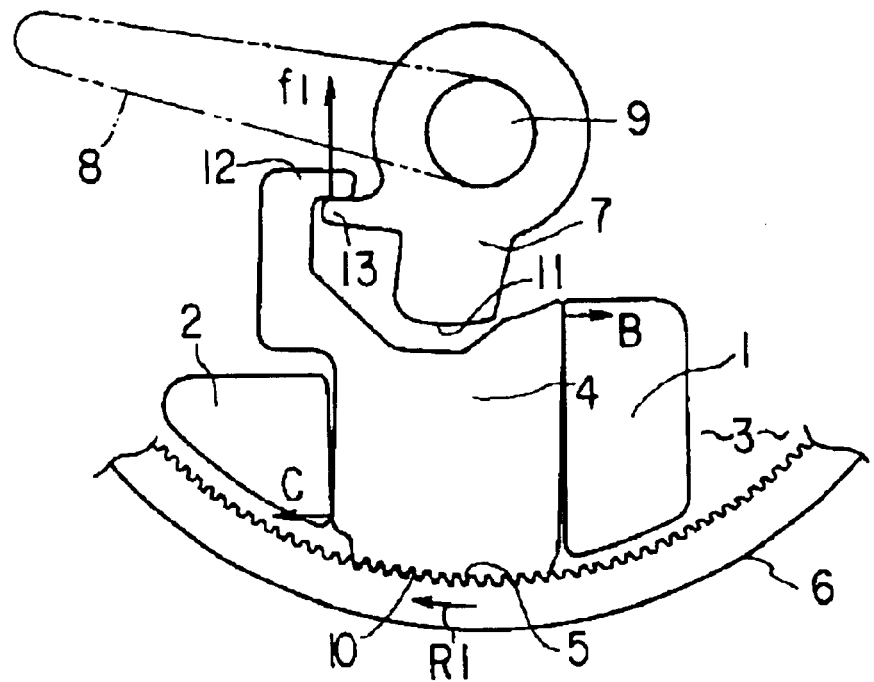
FIG. 20 is a side view when a cam member of the reclining apparatus shown in FIG. 18 is operated in a lock canceling direction.
Figure 21:
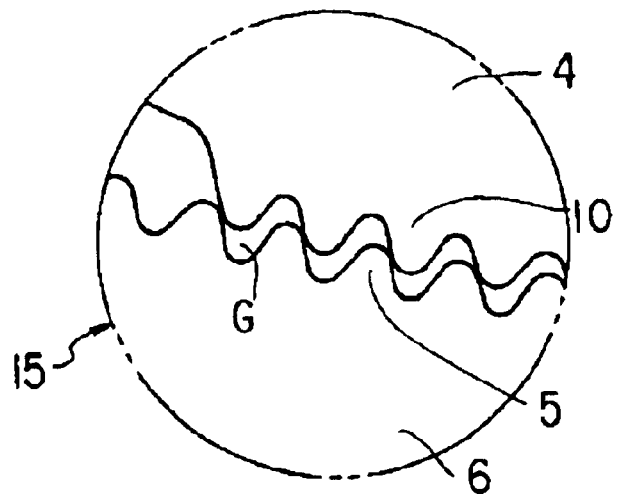
FIG. 21 is an enlarged view of a part of an engaging portion between a slide gear and an internal gear in FIG. 19.
Figure 22B:
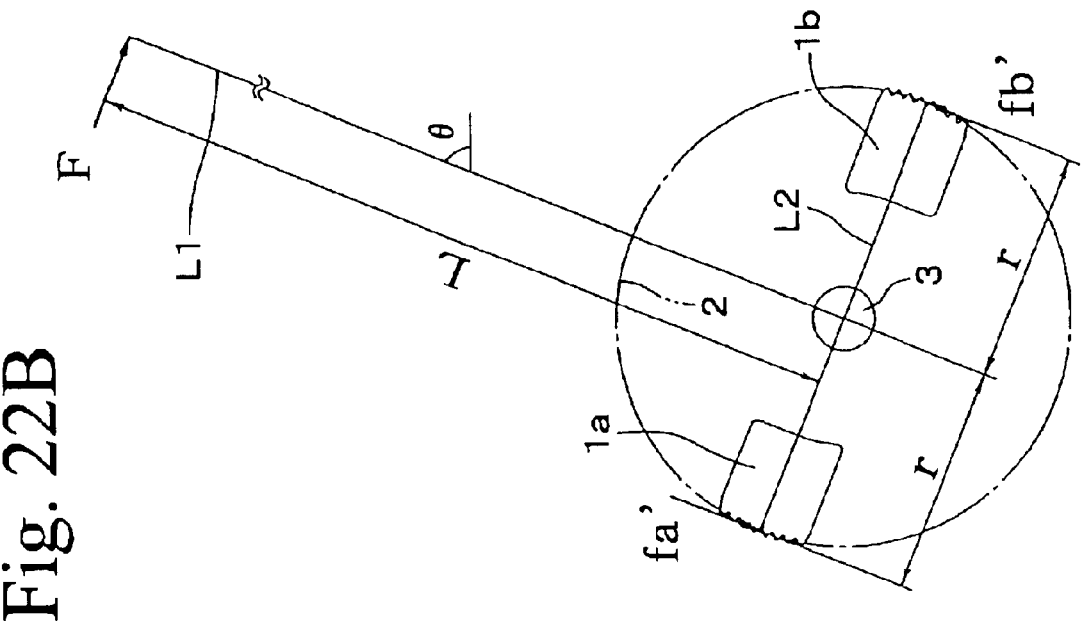
FIG. 22B is a side view schematically showing an arrangement of a slide gear in the reclining apparatus in accordance with the present invention.
Figure 22A:
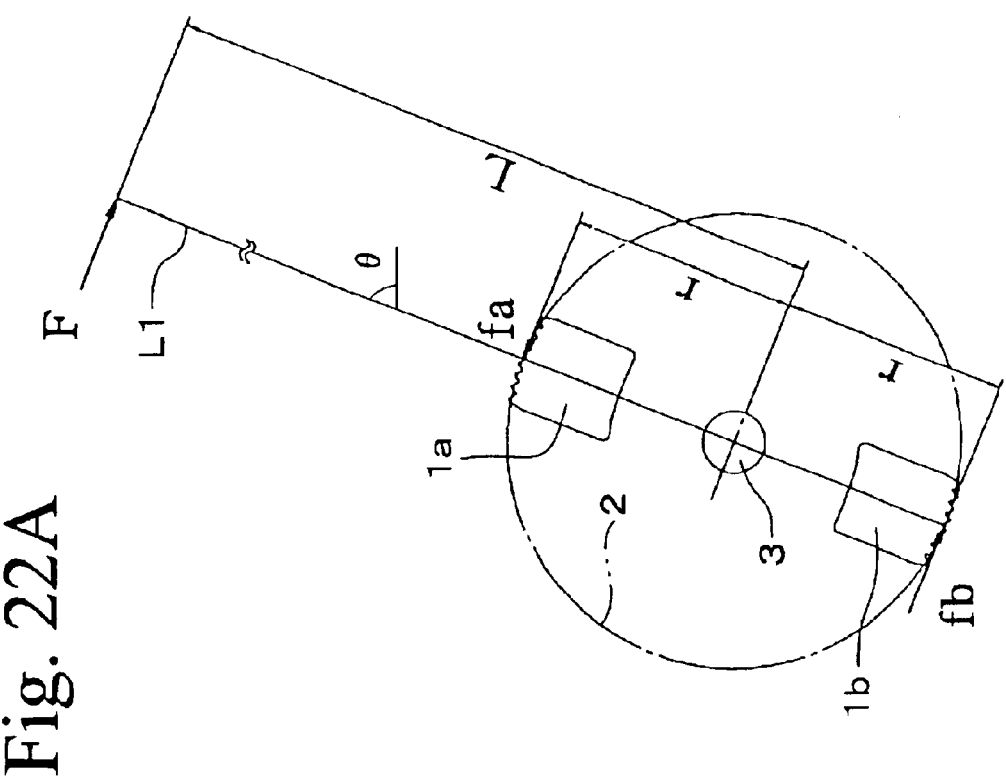
FIG. 22A is a side view schematically showing an arrangement of a slide gear in the conventional reclining apparatus.

In this case, a description will be given of a positional relation among the holding members 59, 59 and 62 and the stopper 58 with reference to FIG. 16. The reclining apparatus is mounted to the seat as shown in FIG. 16 in which the right side is shown as the front side. At first, one (rear) flange portion 23 in the fixed plate 21 extends downward, and another flange portion 23 is directed forward. Furthermore, one (rear) stopper 58 in the fixed plate 21 is arranged a little upward in the rear portion, and another stopper 58 is formed at a position moving at about 120 degrees in a clockwise direction in FIG. 16 from the stopper 58. The holding member 62 of the rotary plate 22 is arranged so as to move between upper sides of the stoppers 58 and 58.

Furthermore, the respective flange portions 29 in the fixed plate 21 are respectively formed immediately below the front and rear stoppers 58 and 58 and at front and rear positions symmetrical with respect to a point around the shaft 30, so that the respective holding members 59 fixed to the flange portions 29 are set to have an arrangement relation corresponding to the respective flange portions 29.

As shown in FIG. 4, the pin 62a of the holding member 62 in the side of the rotary plate 22 protrudes outward in a comparatively longer manner, and the end portion 60b in the outer peripheral side of the spiral spring (the urging member) 60 urging the seat back in a direction of tilting forward is engaged with the protruding portion. The spiral spring 60 is mounted so that the bracket 61 is received in the center space portion thereof, and the end portion 60a in the inner peripheral side is engaged with the vertical plate portion 61a of the bracket 61. Furthermore, the end portion 60b in the outer peripheral side of the spiral spring 60 is engaged with the pin 62a in a condition of twisting the spiral spring 60. Accordingly, the torque around the shaft 30 (the torque in the direction of forward tilting the seat back) is applied to the rotary plate 22. That is, the holding member 62 commonly serves as the means for engaging the spiral spring 60 with the rotary plate 22.

The reclining apparatus 20 having the structure mentioned above is assembled, as shown in FIG. 16, such that one slide gear 71 is arranged forward (in a right side) and another slide gear 70 is arranged backward, speaking in more detail, they are arranged longitudinally so that a moving direction thereof is tilted slightly forward ascending direction. In this case, the front and rear holding members 59 in the side of the fixed plate 21 mentioned above are respectively provided in the slide gears 70 and 71 one by one. Furthermore, as shown in FIG. 3, the center of the pin 59a of each of the holding member 59 is located within the range of the width W extending in the engaging direction (the outer peripheral direction) of the slide gears 70 and 71. Furthermore, the portion in which each of the holding members 59 holds the rotary plate 22, that is, most of an overlapping portion between the flange 59b and the rotary plate 22 is located within the range of the width W extending in the engaging direction of the slide gears 70 and 71. The arrangement mentioned above is applied to the right reclining apparatus 20' in the same manner.

In accordance with the fourth embodiment mentioned above, without relation to the position of the rotary plate 22 rotating together with the tilting motion of the seat back, the respective holding members 59 in the side of the fixed plate 21 always hold the rotary plate 22 in the fixed plate 21 near the engaging position between the slide gears 70 and 71 and the internal gear 66. This is because the holding member 59 is provided in the fixed plate 21 and the relative position with respect to the slide gears 70 and 71 is always fixed without relation to the rotation of the rotary plate 22. Since the respective holding members 59 are located near the engaging position as mentioned above, it is possible to effectively restrict the force breaking away both the plates 21 and 22 which is generated around the engaging position. As a result, it is possible to always sufficiently secure the engaging force between the slide gears 70 and 71 and the internal gear 66, and further, it is possible to make the reclining apparatus 20 (20') compact and light and improve the strength. In particular, in the respective holding members 59, most of the portions holding the rotary plate 22 are located within the range of the width W extending in the engaging direction of the slide gears 70 and 71, as shown in FIG. 16, it is possible to effectively apply the operation restricting the force for breaking away both of the plates 21 and 22.

What is claimed is:

1. A reclining apparatus comprising:
   a fixed plate in which a first guide portion having a pair of mutually opposing guide walls and a second guide portion having a pair of mutually opposing guide walls are formed;
   a shaft having an axis provided in the fixed plate so as to allow the shaft to freely rotate about the axis;
   a rotary plate relatively rotating around the shaft with respect to the fixed plate and in which an internal gear is formed along a circular arc around the shaft;
   a first slide gear received between respective guide walls of the first guide portion and freely moving between a lock position engaged with the internal gear and a lock canceling position moving apart from the internal gear; and
   a second slide gear received between respective guide walls of the second guide portion and freely moving between a lock position engaged with the internal gear and a lock canceling position moving apart from the internal gear; and
   a cam member provided between the first and second slide gears and simultaneously driving the first and second slide gears between the lock position and the lock canceling position,
   wherein the cam member has a pair of hook portions engaging with receiving portions respectively formed in the first and second slide gears, the receiving portion overlaps with a center line of the slide gear in an area inside both side surfaces of the slide gear, the hook portion overlaps with the center line of the slide gear when the cam member drives the first and second slide gears to the lock canceling position.

2. A reclining apparatus comprising:
   a fixed plate in which a first guide portion having a pair of mutually opposing guide walls and a second guide portion having a pair of mutually opposing guide walls are formed;
   a shaft having an axis provided in the fixed plate so as to allow the shaft to freely rotate about the axis;
   a rotary plate relatively rotating around the shaft with respect to the fixed plate and in which an internal gear is formed along a circular arc around the shaft;
   a first slide gear received between respective guide walls of the first guide portion and freely moving between a lock position engaged with the internal gear and a lock canceling position moving apart from the internal gear; and
   a second slide gear received between respective guide walls of the second guide portion and freely moving between a lock position engaged with the internal gear and a lock canceling position moving apart from the internal gear; and
   a cam member provided between the first and second slide gears and simultaneously driving the first and second slide gears between the lock position and the lock canceling position;
   a bracket fixed to the fixed plate near the shaft; and
   a spiral spring in which an inner peripheral end portion thereof is engaged with the bracket and an outer peripheral end portion thereof is engaged with the rotary plate so as to rotate the rotary plate in a direction that the seat back tilts forward,
   wherein the bracket is provided with a vertical plate portion protruding out from an end surface of the fixed plate in an axial direction so as to engage with an inner peripheral side end portion of the spiral spring, and a bottom plate portion extending toward the shaft from an edge portion in the fixed plate side of the vertical plate portion, the bracket is fixed to the fixed plate by the bottom plate portion, and
   the vertical plate portion is formed in a substantially semicircular cylindrical shape around the shaft, a plurality of notches extending to the vertical plate portion and the bottom plate portion are formed in a crossing portion between the vertical plate portion and the bottom plate portion, and convex portions fitting into the notches are provided in the fixed plate.

3. A reclining apparatus as claimed in claim 2, wherein a pin protruding to the fixed plate side along an axial direction is provided in an outer peripheral portion of the rotary plate, an outer peripheral side end portion of the spiral spring is engaged with the pin, a flange preventing the fixed plate from breaking away from the rotary plate is provided at a middle position between the spiral spring and the fixed plate in the pin, and
   a stopper being brought into contact with the pin when the fixed plate and the rotary plate relatively rotate at a predetermined angle is provided in the outer peripheral portion of the fixed plate.

4. A reclining apparatus as claimed in claim 3, wherein in one of the fixed plate and the rotary plate, a linear protrusion being in slidable contact with another is provided all around the periphery of the shaft.

5. A reclining apparatus, comprising:
   a fixed plate in which a first guide portion having a pair of mutually opposing guide walls and a second guide portion having a pair of mutually opposing guide walls are formed;
   a shaft having an axis provided in the fixed plate so as to allow the shaft to freely rotate about the axis;
   a rotary plate relatively rotating around the shaft with respect to the fixed plate and in which an internal gear is formed alone a circular arc around the shaft;
   a first slide gear received between respective guide walls of the first guide portion and freely moving between a lock position engaged with the internal gear and a lock canceling position moving apart from the internal gear; and
   a second slide gear received between respective guide walls of the second guide portion and freely moving between a lock position engaged with the internal gear and a lock canceling position moving apart from the internal gear; and
   a cam member provided between the first and second slide gears and simultaneously driving the first and second slide gears between the lock position and the lock canceling position;

wherein an urging member interposed between the fixed plate and the rotary plate and rotating the rotary plate in a direction in which the seat back tilts forward is provided, and that a center of an engaging position between the first and second slide gears and the internal gear is arranged on a line perpendicularly crossing a line along a standard tilt angle of the seat back and passing through a center of rotation of the rotary plate.

6. A reclining apparatus as claimed in claim 1, comprising:

a fixed plate in which a first guide portion having a pair of mutually opposing guide walls and a second guide portion having a pair of mutually opposing guide walls are formed;

a shaft having an axis provided in the fixed plate so as to allow the shaft to freely rotate about the axis;

a rotary plate relatively rotating around the shaft with respect to the fixed plate and in which an internal gear is formed along a circular arc around the shaft:

a first slide gear received between respective guide walls of the first guide portion and freely moving between a lock position engaged with the internal gear and a lock canceling position moving apart from the internal gear; and a second slide gear received between respective guide walls of the second guide portion and freely moving between a lock position engaged with the internal gear and a lock canceling position moving apart from the internal gear; and a cam member provided between the first and second slide gears and simultaneously driving the first and second slide gears between the lock position and the lock canceling position;

a pair of holding members provided in the fixed plate, rotatably supporting the rotary plate and preventing the rotary plate from breaking away from the fixed plate; and an urging member interposed between the fixed plate and the rotary plate and rotating the rotary plate in a direction in which the seat back tilts forward, wherein each of the pair of holding members is provided close to one of the slide gears, and wherein at least a part of one of the holding members is located within a circumferential width of one of the first and second slide gears.

* * * * *